US008182782B1

(12) United States Patent
Moravsky et al.

(10) Patent No.: US 8,182,782 B1
(45) Date of Patent: May 22, 2012

(54) METHODS FOR PRODUCTION OF DOUBLE-WALLED CARBON NANOTUBES

(76) Inventors: Alexander P. Moravsky, Tucson, AZ (US); Raouf O. Loutfy, Tucson, AZ (US)

( * ) Notice: Subject to any disclaimer, the term of this patent is extended or adjusted under 35 U.S.C. 154(b) by 403 days.

(21) Appl. No.: 10/269,743

(22) Filed: Oct. 9, 2002

Related U.S. Application Data

(62) Division of application No. 09/680,291, filed on Oct. 6, 2000, now abandoned.

(51) Int. Cl.
*D01C 5/00* (2006.01)
(52) U.S. Cl. .................................. 423/447.3; 423/445 R
(58) Field of Classification Search ............... 423/447.3, 423/447.1, 445 R, 445 B
See application file for complete search history.

(56) References Cited

U.S. PATENT DOCUMENTS

| | | | |
|---|---|---|---|
| 5,498,925 A | 3/1996 | Bell et al. | |
| 5,747,161 A | 5/1998 | Iijima | |
| 5,830,326 A | 11/1998 | Iijima | |
| 6,090,363 A | 7/2000 | Green et al. | |
| 6,156,256 A | 12/2000 | Kennel | |
| 6,346,136 B1 | 2/2002 | Chen et al. | |
| 6,400,088 B1 | 6/2002 | Livingston et al. | |
| 6,409,567 B1 | 6/2002 | Amey et al. | |
| 6,420,827 B1 | 7/2002 | Lee et al. | |
| 6,465,132 B1 | 10/2002 | Jin | |
| 6,471,936 B1 | 10/2002 | Chen et al. | |
| 6,511,527 B2 | 1/2003 | Yang et al. | |
| 6,517,800 B1 * | 2/2003 | Cheng et al. ............... | 423/447.1 |
| 6,529,312 B1 | 3/2003 | Saxe | |
| 6,692,717 B1 * | 2/2004 | Smalley et al. ........... | 423/445 B |
| 6,790,426 B1 * | 9/2004 | Ohsaki ...................... | 423/447.2 |
| 2001/0024078 A1 | 9/2001 | Dimitrijevic et al. | |
| 2002/0112814 A1 | 8/2002 | Hafner et al. | |

FOREIGN PATENT DOCUMENTS

| | | |
|---|---|---|
| CA | 2 370 022 | 10/2000 |
| FR | 2826646 | 1/2003 |
| FR | 2832995 | 6/2003 |
| WO | WO 99/65821 | 12/1999 |
| WO | WO0017102 A1 | 3/2000 |

OTHER PUBLICATIONS

Kiang et al. "Catalytic Synthesis of Single-Layer Carbon Nanotubes with a Wide Range of Diameters", 1994, Journal of Physical Chemistry, vol. 98, pp. 6612-6618.*
Bacsa, R.R. et al. "High specific surface area carbon nanotubes from catalytic chemical vapor deposition process", *Chemical Physics Letters* 323: 566-571 (2000).
Cassell et al., "Large Scale CVD Synthesis of Single-Walled Carbon Nanotubes", *J. Phys. Chem. B.*, 103 (31): 6484-6492 (1999).
Cheng, H.M. et al., "Large-scale and low-cost synthesis of single-walled carbon nanotubes by the catalytic pyrolysis of hydrocarbons", *Applied Physics Letters*, 72(25): 3282-3284 (1998).

Cheng, H.M. et al., "Bulk morphology and diameter distribution of single-walled carbon nanotubes synthesized by catalytic decomposition of hydrocarbons", *Chemical Physics Letters* 289: 602-610 (1998).
Colomer, J.F., et al., "Synthesis of single-wall carbon nanotubes by catalytic decomposition of hydrocarbons", *Chem. Comm.*: 1343-1344 (1999).
Flahaut, E., et al., "Synthesis of single-walled carbon nanotube-Co-MgO composite powders and extraction of the nanotubes", *The Royal Society of Chemistry*: 249-252 (2000).
Dai, Hongjie et al., Single-wall nanotubes produced by metal-catalyzed disproportionation of carbon monoxide, *Chemical Physics Letters* 260:471-475 (1996).
Hafner, Jason H. et al., "catalytic growth of single-wall carbon nanotubes from metal particles", *Chemical Physics Letters* 296: 195-202 (1998).
Hernadi, K. et al., "Synthesis, Properties & Application—Catalytic Synthesis of Carbon Nanotubes", *Springer Series*, 33: 81-97 (1998).
Hiraoka, Tatsuki, et al. "Selective synthesis of double-wall carbon nanotubes by CCVD of acetylene using zeolite supports," *Chemical. Physics Letters* 382: 679-685 (2003).
Hongo, H. et al., "chemical vapor deposition of single-wall carbon nanotubes on iron-film-coated sapphire substrates," *Chemical Physics Letters* 361: 349-354 (2002).
Hutchison, J.L. et al., "Double-walled carbon nanotubes fabricated by a hydrogen arc discharge method", *Carbon* 39: 761-770 (2001).
Kiang, C. et al., "Catalytic Synthesis of Single-Layer Carbon Narotubes with a Wide Range of Diameters", *J. Phys. Chem.* 98: 6612-6618 (1994).
Kitiyanan, et al., "Controlled production of single-wall carbon nanotubes by catalytic decomposition of CO on bimetallic Co—Mo catalysts", *Chemical Physics Letters* 317: 497-503 (2000).
Li, Qingwen et al., "Pulsed CVD growth of single-walled carbon nanotubes", *Carborr*. 2873-2884 (2003).
Li, W.Z. et al., "Clean double-walled carbon nanotubes synthesized by CVD", *Chemical Physics Letters* 368: 299-306 (2003).
Liu, C. et al., "Semi-continuous synthesis of single-walled carbon nanotubes by a hydrogen arc discharge method," *Carbon* 37: 1865-1868 (1999). Peigney, Alain et al., "A study of the Formation of Single- and Double- Walled Carbon Nanotubes by a CVD Method", *J. Phys. Chem.* B. 105: 9699-9710 (2001).
Resasco, W.E., et al., "A scalable process for production of single-walled carbon nanotubes (SWNTs) by catalytic disproportionation of CO on a solid catalyst", *Journal of Nanoparticle Research*, 4: 131-136 (2002).
Saito, Yahachi, et al., "Growth Conditions of Double-Walled Carbon Nanotubes in Arc Discharge", *J. Phys. Chem. B*, 107: 931-934 (2003).
Zhou Zhenping, et al., "Producing cleaner double-walled carbon nanotubes in a floating catalyst system", *Carbon*, 41: 2607-2611 (2003).
Zhou Zhenping, et al., "Controllable growth of double wall carbon nanotubes in a floating catalyst system", *Carbon*, 41: 337-342 (2003).
Zhu, Hongwei, et al., "A new method for synthesizing double-walled carbon nanotubes", *Carbon* 40: 2021-2040 (2002).

* cited by examiner

*Primary Examiner* — Edward Johnson
(74) *Attorney, Agent, or Firm* — Scully, Scott, Murphy & Presser, P.C.

(57) ABSTRACT

The present invention relates to fullerene carbon nanotubes having a cylindrical wall comprising a double layer of carbon atoms and methods for the production and application of these double-wall carbon nanotubes; and, more particularly, to nanotubes with controlled number of carbon layers and methods for the production of macroscopic amounts of these nanotubes and there application as cathode materials in the cold field electron emission devices, notable such devices comprising light emitting CRT's.

3 Claims, 20 Drawing Sheets

METHODS FOR PRODUCTION OF DOUBLE-WALLED CARBON NANOTUBES

RELATED APPLICATIONS

This is a divisional application of application U.S. Ser. No. 09/680,291, filed on Oct. 6, 2000 now abandoned.

The present invention relates to fullerene carbon nanotubes having a cylindrical wall comprising a double layer of carbon atoms and methods for the production and application of these double-wall carbon nanotubes; and, more particularly, to nanotubes with controlled number of carbon layers and methods for the production of macroscopic amounts of these nanotubes and to novel cold field electron emission devices embodying such nanotubes.

BACKGROUND OF THE INVENTION

Because of their unique mechanical and electric properties, the recently discovered fullerene nanotubes, both Single-Walled Nanotubes (SWNTs) and Multi-Walled Nanotubes (MWNTs) have been investigated for many applications. Indeed these are materials of such widespread interest that the application development has out-paced its mass availability. The most added-value applications that are being developed using nanotubes include Field Emission Devices, Memory devices (high-density memory arrays, memory logic switching arrays), Nano-MEMs, AFM imaging probes, distributed diagnostics sensors, and strain sensors. Other key applications include: thermal control materials, super high tensile strength (about 20 times higher than steel) and light weight (one-sixth of steel) reinforcement and nanocomposites, EMI shielding materials, catalysts and catalytic support, gas storage materials, high surface area electrodes, and light weight and high conductance wires.

The as-produced by most of known techniques, carbon nanotubes are, in essence, large fullerenes, see B. I. Yakobson and R. E. Smalley, *American Scientist*, 85, 324-337 (1997). They are ideally composed of one or more closed-cap seamless cylinders made of rolled-up graphene network, known for its supreme in-plane strength, that imparts a carbon nanotube with exceptionally high longitudinal stiffness. Carbon nanotubes are predicted to have very high stiffness and axial strength, as a result of perfect structure and of their very high aspect ratios (L/D) compared to commonly used high strength fiber [Rao A M, Richter E, Bandow S, Chase B, Eklund P C, Williams K A, Fang S, Subbaswamy K R, Menon M, Thess A, Smalley R E, Dresselhaus G, Dresselhaus M S, Science 1997, 275, 187-191]. MWNT are typically 3-100 nm in diameter and with aspect ratio typically less than 100. The MWNT consists of 5 concentric graphene layers up to about 50 layers. However, the numbers of layers are very difficult to control. SWNT on the other hand consists of single graphene layer with diameter typically in the range of 1.2-3 nm and with very large ($10^4$-$10^5$) aspect ratio. The values of the Young's modulus for SWNTs and MWNTs were identified experimentally to be in the Tera-Pascal range, thus much exceeding that value for any other reinforcement materials, including the record number of about 800 GPa for famous carbon whiskers, first made by Roger Bacon, "Growth, Structure and Properties of Graphite Whiskers", *Journal of Applied Physics*, 31, 283 (1960).

The electronic properties and applications of nanotubes are not less attractive. The SWNTs have large specific surface area, which has enhanced chemical reactivity due to its curvature, with the unique porous structure. Combined with excellent electrical conductivity, this peculiar feature makes nanotubes an ideal electrode material for advanced batteries and fuel cells, in particular, for lithium-ion battery electrodes. The inner hollow cavity of the tubes can incorporate foreign atoms; one of the appealing applications of this property is designing of metallic quantum nano-wires.

The field-emitting properties of carbon nanotubes are remarkable for several reasons. In particular, very large stable currents are produced from nanotube arrays using only moderate electric fields. However, several field-emitting characteristics need to be optimized for the application of nanotubes in flat-panel displays, which does appear to be on track presently in many research and engineering groups, as it is the most promising among other applications for shortly large-scale industrial implementation. One is the "turn-on" field, which is required to produce a current density of 10 $\mu A/cm^2$; the other is the "threshold" field that provides 1 $mA/cm^2$ current density, which value is considered to be the minimum current density for applications in flat-panel displays. The lower the threshold field, the more suitable the emitter becomes for practical purposes. At the moment the SWNTs are the best performers for these parameters. However, any material for practical emitters must furnish acceptable performance durability. The MWNTs are very robust in low vacuum and thus meet this requirement, while SWNTs fail to perform the same perfectly, because of lower robustness due to degradation at high currents. This implies, that some kind of thin multi-walled tubes, that would be of close to that of SWNTs diameter and yet retain the robustness of thick MWNTs, is the promising object for matching to optimal field emission parameters. Further, to obtain stable emission from the hypothetical thin MWNTs, they should be of uniform diameter and properties. The present invention has been made in the course of work aimed the experimental verification of these predictions. With the double-walled nanotubes (DWNTs) the anticipated advantages of thin-walled tubes for field emission came completely true, which is one of the objects of the present invention. The very study of DWNT properties, observation of field femission and discovery of its outstanding parameters have become possible upon obtaining the bulk quantities of almost pure DWNTs we have accomplished and described for the first time nationally and internationally in the present invention. We have shown that superior parameters of emitters, described in the present invention, are due to high purity of DWNTs employed in their manufacturing and their unique electronic properties. Before the present invention, no methods for selective production of thin-walled carbon nanotubes, including DWNTs, have been reported. Even those thin-walled nanotubes, including DWNTs, in principal exist, has been known from electron microscopy (EM) identification of very sparse such tubes in the carbon products formed in some high-temperature processes, mainly in the syntheses of SWNTs and/or MWNTs. No other means for their identification or property studies was ever employed, as DWNTs have not been available as a matter substance, even in microgram scale, nor could any their amount be separated from the mixture of said carbon products for positive identification. To obtain bulk amounts of almost pure DWNTs, we surprisingly found that by conducting experiments in conditions very close to those in [Liu C, Cong H. T, Li F, Tan P. H, Cheng H. M, Lu R, Zhou B. L. Carbon 1999; 37: 1865-1868], except that the normal method of electrode construction and orientation (i.e. 'end to end') were used, the macroscopic quantities of Double Walled Nanotubes (DWNTs) were formed as the dominant component in the product mixture, as we describe herein.

SWNTs have been discovered in an arc-discharge (AD) process of simultaneous vaporization of graphite and a metal catalyst, see S. Iijima and T. Ichihashi, "Single-Shell Carbon Nanotubes of 1-nm Diameter," *Nature* 363, 603-605 (1993) and D. S. Bethune et al., *Nature,* 363, 605-607 (1993). The product contains SWNTs, fullerenes, amorphous carbon, graphite microparticles, naked and carbon coated metal particles. The catalyst and arcing conditions have been modified repeatedly in studies aimed to increase the SWNT yield, see, for EXAMPLE, C. Journet and P. Bernier, "Production of carbon nanotubes", *Appl. Phys. A*67, 1 (1998).

The AD technique is inexpensive and easy to implement, but initially it has been producing well below a currently common level of 20 wt. % of SWNTs on the average in the total soot produced. It was a development by Journet et al., "Large-Scale Production of Single-Walled Carbon Nanotubes by the Electric-Arc Technique," *Nature* 388, 756-758 (1997), using a mixture of 4.2 at. % Ni and 1 at. % Y as a catalyst, that pushed the yield of the AD method to about 10-20% on average, with a small portion of the soot (the collaret) containing essentially larger amount of SWNTs, reaching 70%. The same high value was recently reported for the SWNT yield in a AD system, employing a sulfur-promoted Fe/Co/Ni catalyst and hydrogen-containing gas media, see C. Liu et al., "Semi-Continuous Synthesis of Single-Walled Carbon Nanotubes by a Hydrogen Arc Discharge Method", *Carbon,* 37, 1865-68 (1999). In this work, the geometry of the arc experiment was essentially different from the conventional one. Instead of a composite M/C anode rod, a wide shallow groove filled with a mixture of graphite and metal powders was used for an anode. The pencil-like sharpened cathode rod was tilted with respect to the working surface of the anode, instead of the 'end to end' anode-cathode geometry normally employed. These unusual conditions are considered to be important for obtaining SWNTs in a high yield. As assessed from electron micrographs value for the yield was 70 vol. %. Three well-resolved peaks at 1593 $cm^{-1}$, 1576 $cm^{-1}$ and 1569 $cm^{-1}$ in the resonant Raman spectrum conform with abound presence of SWNTs in the as-produced material. The average diameter of the SWNTs, as determined from the high-resolution transmission electron microscopy (HRTEM) images, was 1.85 nm. That is, the SWNTs were generally thicker than those usually obtained in other known AD systems, where the diameter distribution averages to ~1.3 nm.

Soon after the discovery of the AD method, a pulsed laser vaporization (PLV) of transition-metal/graphite composite pellets was found to produce high quality SWNT material, see P. Nikolaev et al., "Catalytic Growth of Single-Walled Nanotubes by Laser Vaporization," *Chem. Phys. Lett.* 243, 49 (1995). Various modifications of the PLV technique have been made to improve the yield of SWNTs and to elucidate the mechanism of their formation, e.g., by using double laser pulses or by dividing the target into graphite and metal halves along the cylindrical axis, see A. Thess et al., "Crystalline Ropes of Metallic Carbon Nanotubes," *Science* 273, 483 (1996) and M. Yudasaka et al., "Single-Wall Carbon Nanotube Formation by Laser Ablation using Double-Targets of Carbon and Metal," *Chem. Phys. Lett.* 278, 102 (1997). Continuos laser and solar irradiation produce SWNTs as well, although with lower yield, see E. Munos et al., "Structures of Soot Generated by Laser Induced Pyrolysis of Metal-Graphite Composite Targets", *Carbon,* 36, 525 (1998) and D. Laplaze et al., "Carbon Nanotubes: The solar Approach", *Carbon,* 36, 685 (1998). The optimal metal concentration in the PLV pellets is 6-10 wt. %, the same as in AD anode rods. The pellet, vaporized by laser beam, is usually maintained at 1200° C., and Ar at 500 Torr is used as carrier gas. The SWNT produced with this method form bundles, that consist of about 100 SWNTs. The SWNT yield in the PLV method can be as high as 70-90 vol. %; however, the production rate is about an order of magnitude lower compared to conventional laboratory scale arc process. The bulk rate of SWNT-containing soot production can be substantially increased by rising laser power, however, at the expense of the reduction in SWNT yield, see, for EXAMPLE, A. G. Rinzler et al., "large-scale Purification of Single-Wall Carbon Nanotubes: Process, Product, and Characterization," *Appl. Phys. A* 67, 29 (1998).

The catalytic chemical vapor deposition (CCVD) of carbon-containing gases for SWNTs synthesis has been first demonstrated with disproportionation of carbon monoxide at 1200° C. when molybdenum or Ni/Co particles supported on alumina are used as catalysts. The nanotube diameters in the range from 1 to 5 nm have been observed, and catalytic particles of the same size have been occasionally found attached to the nanotube end on HRTEM images. This result represents the first experimental evidence of SWNT production by the pre-formed catalytic particles. The CCVD of hydrocarbons for SWNTs was first reported by K. Hemadi et al., *Carbon,* 34, 1249-1257 (1996). Acetylene decomposition over silica or zeolite-supported transition-metal catalysts at 700° C. yields both SWNTs and MWNTs. The surface density and size of catalyst particles were found to be of importance in regulating the shape of the produced nanotubes. It was essential to highly disperse these metal catalysts on high surface area substrates to produce SWNTs. Large metal particles typically produce nanofibers. The SWNT production rate was below a gram per hour. The product properties varied greatly depending on the reagent gas used and the method of catalyst preparation.

A "floating catalyst" variant of the CCVD technique has been reported to produce SWNTs at 1200° C. from benzene or methane in the presence of metal iron catalyst, formed from the vapor of ferrocene drawn through the tubular reactor by hydrogen flow. The SWNTs thus obtained have larger diameters (~1.75 nm) compared to those obtained by AD and PLV techniques (~1.3 nm). The addition of thiophene was found to be effective in promoting the growth of SWNT and in increasing the yield of either SWNT or MWNTs under different growth conditions, see H. M. Cheng et al., "large-scale and low-cost Synthesis of Single-Walled Carbon Nanotubes by the Catalytic Pyrolysis of Hydrocarbons", *Phys. Lett.* 72, 3282 (1998).

While we are in the search for efficient production of SWNTs in the arc discharge process and in CCVD systems for several years, and have attempted reproduction of some reported results. It was surprising to find that by conducting arc discharge experiments with Fe/Co/Ni/S catalyst in Hydrogen ($H_2$)/Argon (Ar) atmosphere we have obtained the products, containing macroscopic quantities of double-walled nanotubes (DWNTs) along with concomitant minor quantities of SWNTs, contrary to what might be expected on the base of presented above results of Liu et al., *Carbon,* 37, 1865-68 (1999), that were obtained with similar catalyst and gas atmosphere. Upon optimization of the conditions for the high yield of DWNTs in the arc process, we became capable of producing DWNTs with high selectivity, corresponding to less than one (1) SWNT observed in HRTEM images per thirty (30) DWNTs, in accordance with the present invention.

Further, the arc process conditions for producing DWNTs (catalyst, gas atmosphere, chemical dynamics parameters) have been as closely as possible reproduced in attempts to obtain DWNTs by two variants of CCVD technique, including both thermal and high-frequency plasma assisted catalytic pyrolysis of hydrocarbons. These attempts eventually lead to efficient synthesis of DWNTs in both thermal and plasma-assisted variants, as described herein in accordance with the present invention.

DWNTs have already been observed as minor by-products in many catalytic systems for SWNT production, both in arc systems and in conventional CCVD systems employing the pyrolytic decomposition of hydrocarbons over metal catalysts, wherein the amount of DWNTs reported had never been in excess of a few percent that of SWNTs, see, for example, J. Kong et al, "Chemical Vapor Deposition of Methane for Single-Walled Carbon Nanotubes", *Chem. Phys. Letters,* 292, 567 (1998); C. H. Kiang et al., "Catalytic Synthesis of Single-Layer Carbon Nanotubes with a Wide Range of Diameters", *J. Phys. Chem.,* 98, 6612 (1994); J. F. Colomer et al., "Large-Scale synthesis of Single-Wall Carbon Nanotubes by Catalytic Chemical Vapor Deposition (CCVD) Method", Chem. Phys. Letters, 317, 83 (2000). Very rare DWNTs have been observed even in the products of pure graphite vaporization in the arc process, performed without intended addition of metals, see S. Iijima, *Nature,* 354, 56 (1991); T. W. Ebbesen, P. M. Ajayan, "Large-Scale Synthesis of Carbon Nanotubes", *Nature,* 358, 220 (1992). Our invention presents the techniques for efficient and selective production of preponderant DWNTs, wherein they are the dominating product. It confers ready availability on the bulk quantities of DWNTs, thus rendering possible the pioneering studies of their partial physical and chemical properties, as well as exploration of these properties for various applications. Some of these properties of DWNTs have been assessed theoretically, and good prospects have been outlined for appropriate applications, see, for example, J. C. Charlier and J. P. Michenaud, "Energetics of Multilayered Carbon Tubules", *Phys. Rev. Letters,* 70, 1858 (1993); D. H. Robertson et al., "Energetics of Nanoscale Graphitic Tubules", *Phys. Rev. B* 45, 12592 (1992); J. Che et al., "Studies of Fullerenes and Carbon Nanotubes by an Extended Bond Order Potential", *Nanotechnology,* 10, 263 (1999); S. M. Lee et al., "Hydrogen Adsorption and Storage in Carbon Nanotubes", Synthetic Metals", 113, 209 (2000); J. M. Bonard et al., "Field Emission From Single-Wall Carbon Nanotube Films", *Appl. Phys. Lett.,* 73, 918 (1998); O. Groening et al., "Field Emission Properties of Carbon Nanotubes", *J. Vac. Sci. Technol. B* 18, 665 (2000). Generally, real and anticipated advantages of DWNTs over both MWNTs and SWNTs include higher yield in producing pure tubes, and lower production cost. In particular the advantages of DWNTs over MWNTs in structural applications include lower amount of defects, higher aspect ratio, higher strength due to smaller size, higher mechanical flexibility, lower density, and in electronic applications include better opportunities for controlling the tube electronic structure and properties, for example, by donor-acceptor doping or chemical functionalization. Advantages of DWNTs over SWNTs include more versatile electronic properties and greater opportunities for designing nano-scale electronic devices, theoretically predicted better performance in cold field emission, hydrogen storage, and lithium-ion batteries. The defectless structure of DWNTs may turn out to have the highest specific electric conductivity among the nanotubes, since in MWNTs, the electrical current flows only in a few outer layers of the tube, in agreement with magnetotransport experiments, see A. Bachtold et al., *Nature,* 397, 673 (1999). The DWNT could also be an ideal candidate for probe electrodes for scanning tunneling microscopy, as it is practically the same narrow and much more stiffer than a SWNT, while retaining the properties of SWNTs, such as flexibility, and the reversible buckling, rather than brittle breakage under the bending stress, which is characteristic of MWNTs. For the same reasons, the DWNTs are preferred over SWNTs and MWNTs for field emission and biological electrodes. We have found that electron field emission from DWNTs far surpasses in main parameters that of SWNTs, and described this experimental finding herein, in accordance with the present invention.

When a high electric field in the order of $10^7$ V/cm is applied on a solid surface with negative electrical potential, electrons inside the solid is emitted into vacuum by the quantum mechanical tunneling effect. This phenomenon is called electron field emission. Such an extremely high field can be obtained on a sharp tip of a very thin needle, because electric fields concentrate at the sharp points. The carbon nanotubes possess the following properties favorable for field emitters: (1) favorable electronic structure, (2) good in plane electrical conductivity (3) a sharp tip, (4) high chemical stability, and (5) high mechanical strength. In 1995, field emission (FE) from an isolated single MWNT was first reported by Rinzler A G. Hafner J H. Nikolaev P, Lou L, Kim S G Tomanek D. Nordlander P. Colbert D T. Smalley R E. Science 1995:269: 1550-3. Subsequently, many experimental results were published on FE for MWNTs such as by Collins P. G, Zettl A. Appl Phys Lett 1996:69:1969-70, Saito Y. Hamaguchi. K. Hata K. Uchida K, Tasaka Y. Ikazaki F, Yumura M. Kasuya A, Nishina Y. Nature 1997:389:554-5, and Bonard J. M, Maier F, Stoeckli T, Chatelain A. De Heer W A, Salvetat I. P, Forro L., Ultramicroscopy 1998:73:7-15, and for SWNTs such as by Saito Y, Hamaguchi K. Nishino T, Hata K. Tohji K. Kasuya, A, Nishina Y. Jpn J Appl Phys 1997:36:L1340-2, and Bonard J. M., Salvetat I. P., Stoeckli T., De Heer W. A., Forro L, Chatelain A. Appl Phys Lett 1998, 73:918-20. Very recently, nanotubes have been applied as cold electron sources in display devices by Saito Y., Uemura S., Hamaguchi K., Jpn J Appl Phys 1998, 37, L346-8 and successfully manufactured nanotube-based cathode-ray tube (CRT) lighting elements, which revealed stable electron emission, adequate luminance, and long life of the emitters. A recent study by Monteiro O. R, Mammana V. P, Salvadori M. C., Ager J. W, and Dimitrijevic S, Appl. Phys. A 71, 2000, 121-4, and it was shown that the turn-on field measured to be 2.3 V/µm and 2.6 V/µm for SWNTs and MWNTs, respectively.

OBJECTS AND ADVANTAGES OF PRESENT INVENTION

It is a primary object of the present invention to provide a new material comprising a carbon nanotubule having two nearly cylindrical graphene layers.

It is an object of the present invention to provide novel methods for making macroscopic quantities of controlled number of layers nanotubes.

It is another object of the present invention to provide novel methods for making in particular substantially pure double walled nanotubes.

It is still further object of the present invention to provide novel methods for making in particular substantially pure double walled nanotubes.

It is yet a further object of the present invention to provide novel electron emitting carbon structures embodying such double walled nanotubes, which are suitable for making cold cathodes for field emission displays and vacuum microelectronic devices, it is a further object of the present invention to provide novel solid field emission cathode structures embodying such electron emitting carbon structures.

It is more specific object of the present invention to provide a novel light emitting CRT embodying carbon double walled nanotube material the electron emitting structures of the cathode.

These and other objects and advantages will be clear to one skilled in the art upon reading the detailed description to follow.

SUMMARY OF THE INVENTION

In accordance with the present invention there is provided a novel method of producing fullerenes comprising double walled nanotubes (DWNT's), which comprises providing a source of carbon and a catalyst comprised essentially of transition metal of the iron group of the periodic table of elements and sulfur in a reaction zone having a DWNT forming atmosphere comprised essentially of hydrogen containing gas and subjecting the carbon and catalyst to heat in the reaction zone. The heat causes the carbon to vaporize producing a carbon containing vapor the DWNT atmosphere that is quenched therein to condense the vapor resulting in the formation of the DWNT product outside of the heated reaction zone, where it is recovered.

In a preferred embodiment the DWNT atmosphere contains an inert gas in addition to the hydrogen, advantageously argon. The DWNT forming atmosphere is preferably maintained at a pressure in the range of 10 Torr to 3 atmosphere.

In a preferred embodiment the catalyst is comprised essentially of a mixture of iron, cobalt and nickel powder, which is advantageously preheated to cause the sulfur to react with the metal particles of the mixture.

In a preferred embodiment the reaction zone is heated in an electric arc discharge system in a reaction chamber, wherein the DWNT atmosphere is maintained. The arc discharge system advantageously utilized carbon electrodes, one or both of which are consumed to provide some or all of the carbon to be vaporized. Depending upon whether a direct current or an alternate current arc discharge system is employed, one or both of the carbon electrodes will be vaporized to proved carbon as a source of the DWNT product.

Advantageously, the catalyst mixture is placed in a central hole in the consumable electrode (DC system) located at the arc end of the electrode. Carbon particles are advantageously mixed with the catalyst particles to provide further source carbon for vaporization in the reaction zone.

In further embodiments the hydrogen of the DWNT atmosphere is comprised of the hydrogen in a hydrocarbon gas such as methane, ethane and acetylene.

In a further embodiment the DWNTs in accordance with the present invention are produced in a reaction zone within a tubular furnace in a DWNT forming atmosphere to which methane, hydrogen and argon is flowed. The tubular furnace is enclosed within an electric heating system that preferably the reaction zone.

In accordance with a further embodiment the novel DWNTs are embodied in electron emission material comprising a surface consisting primarily of emissive tubules, wherein each of to plurality of emissive tubules is generally nanotube material with controlled number of graphene layers, preferably two graphene layers. In a preferred embodiment, the electron emissive materials comprises at least 70% DWNTs. Preferably, the DWNTs of the electron emissive material has a majority of its DWNTs with a diameter of 2.7 nm to 5.5 nm.

A further aspect of the invention involves the provision of a cold cathode electric field emission device, wherein the cathode is comprised of DWNTs for emitting electrons that infringe upon a fluorescent light emitting element to which they are directed by an anode that may include the fluorescent element structure. A control grid is provided adjacent the cathode and is biased to control the flow of electrons from the cathode to the fluorescent element, thereby controlling the light emitted by the fluorescent element in response to an electrical signal applied to the control grid in the manner of a CRT.

DETAILED DESCRIPTION OF THE INVENTION

Figure 1:
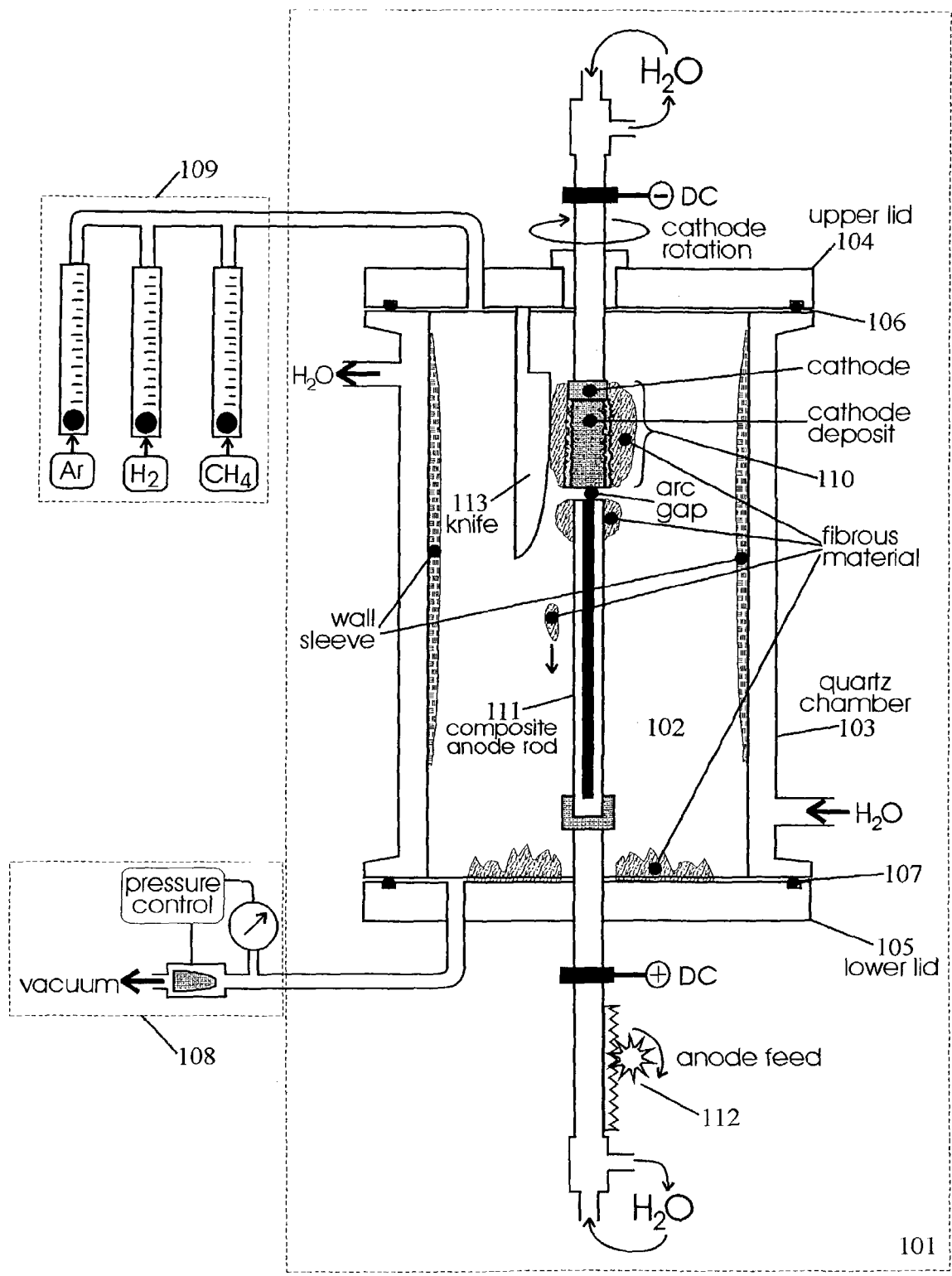
FIG. 1 is a schematic representation of apparatus according to present invention wherein electric arc discharge vaporization of a composite rod is accomplished to result eventually in formation of a DWNT-rich product.

Arc discharge technique and CCVD technique have been used to produce nanotubes with controlled number of layers, and more specifically, DWNTs, for their use thereafter for making cold cathode electron emitting devices.

To produce DWNTs by arc discharge technique, the evaporation of a metal-graphite electrode was employed. The anode was a graphite rod (usually about 8 mm in diameter) with drilled channel (3.2 mm in diameter and 200 mm in length) filled with catalyst. The cathode was a graphite rod 10 mm in diameter and 15 mm in length. The catalyst was prepared in a following way: a mixture of Fe, Co and Ni powder metals and elemental S was ground in a mortar and heated at 750° C. for 1 hour. The conglomerate was then ground in ball mill to a micron particle size and then intimately mixed with carbon powder. A 3.2 mm channel drilled in the graphite anode was tightly filled by this mixture.

The arc synthesis was carried in a reaction chamber (FIG. 1) containing an atmosphere of Ar and $H_2$ mixture. The voltage drop across the arcs gap was 23-26V and the gap width was kept constant and equal to 1.5-2 mm. The duration of the arc evaporation process was about 2 hours. Two types of carbon material were obtained: (1) the cloth like deposit on the reactor walls; and (2) the remaining product deposited on electrodes and cathode deposit as an elastic fibrous material.

Specimens for TEM and HREM were prepared by dispersing the carbon material in acetone in an ultrasonic bath. A drop of the suspension was put on a lacey carbon film supported by a copper grid. HRTEM analysis of typical samples of the as-produced fibrous material, obtained under optimized conditions has shown that the ratio DWNT/SWNT is higher than 30 and the yield of DWNTs exceeds 70 wt. %. So, the DWNTs were the dominant type of structure found in the product of optimized Fe/Co/Ni/S system.

As exemplified below by FIGS. 2-11, the nanotubes combine into bundles with discrete tubules clearly visible on the periphery. Observed length of these tubes in bundles is more than 1 µm. The HRTEM micrographs revealed that most of the tubules consist of two concentric nearly cylindrical graphene layers, double wall nanotubes (DWNTs). In general, the outer diameter of DWNTs range in between 3.4 nm to 5.5 nm while that of the inner tube varied between 2.7 to 4.7 nm. Along with the bundles some discrete separated DWNTs were also observed. The shape of separate DWNTs is often distorted. The periodic change of the width of tubule longitudinal section from 3.75 nm to 5.0 nm along the tube length is quite common and occurs with an interval about 30 nm, DWNTs have rounded double layered terminating caps at the end, see insert on FIG. 2. The shape of the caps is nearly hemispheric, which implies the chiral symmetry for the tube structure. Notably, the interlayer distance measured in the tubule walls is 0.39-0.41 nm, which is larger than that usually observed for MWNTs (0.34-0.36 nm), and thus imparts to DWNTs better opportunities for appropriate intercalation. In this respect, we have established that the smaller diameter of a DWNT, the larger the distance between the layers, compare, for example, a and b images of FIG. 5. This geometric peculiarity of the DWNT structure was predicted by theoretical calculations, and now we provided to it the experimental confirmation.

In most cases, SWNTs are present in the product of the herein arc synthesis along with DWNTs. The diameters of these SWNTs fall in the range of 2.7-4.7 nm that is close to the range of diameters for an inner layer of DWNTs. Thus, these SWNTs may be named "thick SWNTs". The amount of thick SWNTs produced under conditions optimized for DWNT synthesis, does not exceed 1 SWNT per 30 DWNTs. However, under certain conditions thick SWNTs dominate over DWNTs in the product of the synthesis in Fe/Co/Ni/S catalytic system. In some special cases, the diameter of SWNTs becomes smaller (1.7-2 nm) than that usually encountered in optimized DWNT system (2.7-4.7 nm). The periodic oscillation of a thick SWNT diameter, similar to that in DWNTs, is quite commonly observed in HRTEM images. In some cases observed, the thick SWNTs have long (>1 micron) fragments of the second layer, see for example FIG. 5b, thus exemplifying the existence of a combined type of tubes, SWNT→DWNT, which may give a hint for the mechanism of tubes formation. If provided with electrical contacts to SWNT and DWNT portions, these structures would represent, for example, the ever smallest manufactured capacitor, when both layers possess metallic conductivity. Combination of different types of conductivity for inner and outer layers in a tube may give rise to a variety of interesting nanoelectronic devices, besides the obvious attractiveness of this combination for fundamental studies of physical properties of a unique design having only two adjacent graphene layers. The present state-of-the-art in manufacturing the nanoelectronic devices from nanotubes is quite adequate to render this work feasible, see, for example, T. Rueckes et al., "Carbon Nanotube-Based Nonvolatile Random Access Memory for Molecular Computing", Science, 289, 94 (2000).

A few triple-wall carbon nanotubes have been identified in the products, as well as, in some DWNTs the fragments of the third and fourth layers were observed. The study of their occurrence may create opportunities for selective synthesis of corresponding little-wall carbon nanotubes.

It is essential that even small deviations from the optimal synthesis conditions described in detail in "EXAMPLES", have usually lead to a notable decrease in the yield and selectivity for DWNTs and often eventually resulted in a preponderance of SWNTs in the product mixture.

This optimization of the arc synthesis conditions for high yield and high selectivity for DWNTs was performed by variation of externally controlled parameters of the process, such as composition and total pressure of gas atmosphere in the reactor, the composition and procedure of preparation of the catalyst and vaporized electrode, the values of the arc current, the linear rate of consumed electrode feeding into the arc zone, the design and geometry of the experimental setup, specifically, in the vicinity of the arc gap.

We have found that the composition of the catalyst strongly influences the selectivity of the arc process for DWNT production. The whole range of the DWNT/SWNT ratios, from almost pure DWNTs to dominating SWNTs in the corresponding product, can be covered by changing the relative amount of metals in the catalyst, while retaining the same procedure of the catalyst and consumed electrode preparation and other process parameters.

The main effect of sulfur co-catalyst addition was found to be a great enhancement of the yield of nanotubes, both DWNTs and SWNT. It must be noted, although, that appreciable amounts of DWNTs have been found in products obtained with a catalyst totally lacking the sulfur component.

Following the optimal procedure for the catalyst preparation as described above was found to be important for obtaining high selectivity for DWNTs.

Thus, no particular component of the catalyst has been found to be responsible for DWNTs development in the products. Instead, the combination of those components and the procedure of the catalyst preparation are found to largely determine the yield and selectivity for DWNTs.

We have found, that even minor changes in the values of the arc current (within +5% of the optimal value) and the linear feed rate of drawing together the electrodes (within +15% of the optimal value) inflict gross reduction of the selectivity for DWNT, with electrodes of a given diameter and otherwise retained conditions. Most likely, this is because, at least in part, these parameters (arc current and feed rate) largely determine the value of the gap width, which in its turn, is largely responsible for the temperature distribution in the close vicinity of the arc, where DWNTs are predominantly formed and accumulated as a fibrous material attached to the electrodes (FIG. 1), while the temperature is presumably a major factor determining type, size and quality of the tubes produced in the system under consideration.

The above presumption is based on the following consideration. The reported temperature values for the systems for catalytic synthesis of SWNTs are generally larger than those for MWNTs and even more exceed those for catalytic synthesis of vapor grown carbon fibers (VGCF). Thus, a lower temperature is required for a larger diameter, and DWNT synthesis must be effected at lower temperature than that of SWNTs of essentially lower diameter (~1.4 nm), which are commonly produced in an arc process conducted in an atmosphere of helium gas. The temperature of helium arc plasma is much higher than that for the mixture $H_2$+Ar employed in the DWNT synthesis. Moreover, the optimal arc current in the DWNT synthesis (~80 A) is much lower than that of SWNT synthesis (~95 A) for the same diameter (~8.0 mm) composite anodes, thus adding proofs to the necessity of a lower temperature for DWNT synthesis by an arc process.

It is noteworthy that the synthesis temperature decline in the series SWNT>DWNT>MWNT>VGCF is accompanied by the decline of the thermal conductivity and of the rate of linear growth of the carbon structures, precipitated from the metal catalyst particles, in the same series. The logical explanation for this comparison and for the very occurrence of the series under consideration can be provided as follows. The higher specific rate of thinner tubes synthesis cause overheating of metal catalyst particles because of high exothermicity of the process of the carbon uptake from the feedstock. To reduce the particle temperature down to equilibrium value, that is to maintain a steady state particle temperature, a better (more specifically powerful) heat sink is required in the case of thinner tubes. Thus, the least defective in the series, hence most thermally conductive SWNTs are preferred at high temperatures and, accordingly, for highest specific reaction rates in the series, despite the more positive formation enthalpy for SWNTs, compared to thicker homologies in the series, which makes formation of SWNTs less thermodynamically favorable. At somewhat lower temperatures, the formation of thermodynamically more stable DWNTs is preferred, as soon as they succeed in providing the appropriate heat sink.

Similar reasoning, pertaining to MWNTs and VGCF is pertinent, thus, finalizing the rationalization of the occurrence of the series above. Of course, a plethora of other factors should be considered and rationalized before a true kinetic and molecular mechanism of DWNT formation would emerge.

The abound with DWNTs fibrous material, forming in the close proximity to the arc, where the temperature is optimal, soon after the process starts tends to densely surround the arc space and thus to cancel in this area the normal gas circulation necessary for maintaining the stable arc and tube production. Furthermore, the fibrous materials undergo prolonged and excessive heating and illumination, which lead to sintering of nanotubes and their destruction. To avoid these undesirable phenomena, the fibrous material must be permanently removed from the reaction zone. We have chosen a mechanical mode to furnish that removal. A tungsten scraper continuously detaches the fibrous material just formed at the surface of cathode deposit, due to rotation of the cathode during the synthesis. (FIG. 1, the "knife", 113).

The parametric study of the gas atmosphere influence on the synthesis of DWNTs has revealed that there exists an optimal value for the total pressure of a given gas mixture in the reactor. Further, we have found that the ratio $H_2$/Ar strongly influences the selectivity for DWNTs produced under the same total gas pressure. The $H_2$/Ar atmosphere is noticeably productive towards DWNT formation, even with the catalyst-lacking sulfur, as mentioned above. So, the hydrogen is more important for originating DWNTs formation, than the sulfur co-catalyst.

The role of H$_2$/Ar atmosphere in assisting the DWNT formation can be rationalized by allowing for chemical reactivity of hydrogen under plasma conditions, which is an essential distinction from chemical inertness of pure helium atmosphere that is unable to furnish copious DWNT production in the arc. Indeed, the carbon plasma in pure Ar is much colder compared to that in pure He, and therefore graphite is more reluctant to vaporization in pure Ar under the same current density and gas pressure, as those used for facile graphite vaporization in pure He. To produce the same concentration of current carriers, that is the same magnitude of arc currents in Ar and He, a much lower plasma temperature is required in the case of Ar gas, because of a lower value of Ar ionization potential (15.76 eV) compared to that of He (24.5 eV). A regular fullerene arc in the He has a temperature 3600-3900 K, see A. V. Krestinin and A. P. Moraysky, "Mechanism of Fullerene Synthesis in the Arc Reactor", *Chem. Phys. Lett.*, 286, 479 (1998), that is sufficient for facile graphite vaporization in the form of small carbon clusters, mainly C$_2$, C$_3$, and C$_4$. The same current is developed in the Ar arc at approximately only 2400-2600 K, which temperature is ineffective in carbon vaporization, see J. Abrahamson, "Graphite Sublimation Temperatures, Carbon Arcs and Crystallite Erosion", Carbon, 12, 111 (1974), so that, by our observations, the arc can glow for hours with only slight consumption of graphite anode. However, when hydrogen is added to the Ar atmosphere, the anode vaporization becomes much more rapid. Hydrogen molecule has equal to that of Ar ionization potential, so the plasma temperature remains the same upon this addition. The reason for this enhancement of graphite vaporization rate is substitution of small carbon clusters C$_n$ for small hydrocarbon molecules and radicals C$_n$H$_m$ as the species leaving the solid carbon. The higher stability of these C$_n$H$_m$ hydrocarbons renders the vaporization process thermodynamically more favorable compared to the case of naked carbon clusters C$_n$.

Formation of hydrocarbons in the carbon arc operating in H$_2$/Ar atmosphere has been established by our gas-chromatography observations of methane, acetylene, ethylene and some minor products, including benzene, in the effluent form the reactor gas. Under conditions regularly used for DWNT synthesis, these hydrocarbons are diluting the gas by 5-10 vol. %, while it is flowing through the reactor, with concomitant substantial depletion in H$_2$ content. Under gas flowing conditions, up to one third of initial hydrogen is converted into hydrocarbons. Under a stationary H$_2$/Ar atmosphere, which we have found to be less efficient in DWNT production, the degree of conversion is eventually higher and this is why a noticeable pressure drop is observed in the reactor.

Hence the arc system is producing DWNTs in an atmosphere comprising substantial amount of hydrocarbons evolved upon reaction of hydrogen plasma with elemental carbon. In this respect the arc system essentially reminds the systems for carbon nanotube synthesis through catalytic pyrolysis of hydrocarbons over a "floating" or a supported metal catalyst. Indeed, hydrocarbons can play an important role in the arc synthesis of DWNTs by providing an efficient means for transporting carbon to the surface of metal catalyst particles. The need in such a means can be tentatively stipulated by the following kinetic factors. Carbon component of a mixed metal/carbon vapor completely condenses into large amorphous carbon particles, well before the condensation of the metal component starts. These amorphous particles possess low mobility and have slight access to active metal particles, that are producing DWNTs in debris of mentioned above fibrous material, located in appropriately hot space near the arc. The highly thermally stable acetylene and methane could presumably survive this hot temperature as intact molecules for long enough time necessary for reaching the surface of a working metal catalyst particle, thus delivering carbon for dissolution in molten metal and subsequent precipitation as a carbon nanotube.

Figure 5:
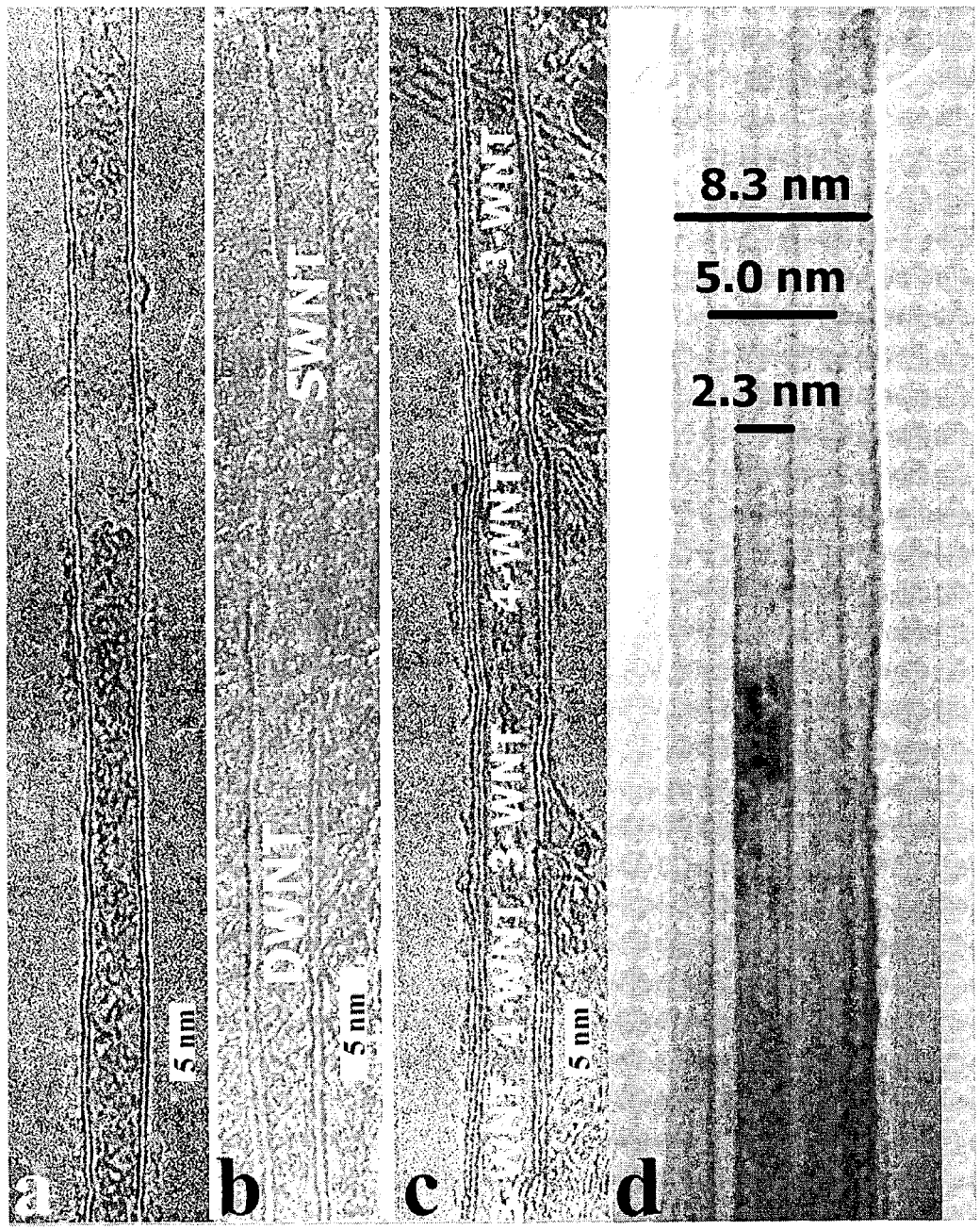
FIG. 5 represents four high-resolution transmission electron microscope micrographs of different structure individual tubes, obtained under certain conditions of the arc process in the catalytic system of the present invention, exhibiting some of their peculiarities described in the text: a) a DWNT with oscillating width of the cross-section, b) a tube combined of DWNT and SWNT segments, c) a generally three-wall tube with segments of the fourth and fragments of the fifth layer, d) a thick SWNT formed inside a cavity of a thicker tube, produced presumably before the build-up of inner tube has started from amorphous carbon accumulated therein; The dark cylinder in the center of SWNT is a remnant of the metal catalyst.

In contrast to other types of fullerene production, notably C60 and C7-0 the DWNTs and the thick SWNTs do not require immediate participation of active small clusters C$_n$ in their growth process, and are formed either from hydrocarbons or much more stable large carbon particulates which are the cooled down to below ca. 1500 C inactive products of entirely completed condensation of carbon vapor. In the absence of hydrocarbons and hydrogen these are exactly amorphous particles that serve for the main carbon feedstock for nanotube production with metal catalyst particle. While studying the TEM images of DWNTs we have found a unique structure, in which a thick SWNT (2.3 nm in diameter) is incorporated in the cavity (5.0 nm in inner diameter) of a larger thin-walled tube along the entire length accessible for observation (FIG. 5*d*). The very existence of such structure provide a reliable proof for the capability of amorphous carbon to serve as a sole carbon feedstock for thick SWNT synthesis. Indeed, the very probable kinetic scenario for this structure formation is as follows. A large metal catalyst particle produces first the outer big tube, while leaving some amorphous carbon in the channel, which is discernible on the most of the HRTEM micrographs of the DWNTs, see for example FIGS. 1 and 5. At a moment a small piece was separated from big metal particle and started moving inside the channel in the opposite direction, consuming amorphous carbon and precipitating that SWNT from its rear side. The growing small tube pushes ahead the particle, thus ensuring its contact with next portions of amorphous carbon in the channel, which is much more reactive towards dissolution in metal, compared to carbon of the inner layer of the large tube. Moreover, conversion of the carbon from inner lining of the big tube into a SWNT is thermodynamically unfavorable, and big tube is easily retained intact, especially allowing for moderately low synthesis temperature. The latter can thus be estimated as the temperature required for efficient (as the half-time of the thick SWNT is presumably below a second) dissolution of the basal plane of HOPG (highly oriented pyrolytic graphite) in metals of iron group, although the perfect structure of the tube inner layer must be less reactive than flat basal plane of HOPG. The crude assessment thus performed gives 1500 C for the upper limit of the SWNT synthesis temperature. Amorphous carbon, present in the cavity, is obviously the sole source of carbon for the growth of SWNT, as hydrocarbons from the reactor gas phase have no chance to reach the surface of the inner catalyst particle. If an excessive for balanced process amount of amorphous carbon is present in the tube, the small metal particle would precipitate the excess inside the newly formed SWNT (as is the case of tube from FIG. 5*d*). Alternatively, the production of DWNT instead of SWNT could get started in the tube segments rich in amorphous carbon. The DWNT growth might be implied from inspection of FIG. 5*d*, although without certainty because of low resolution of image details.

Those favorable conditions for SWNT growth, like uniform distribution and appropriate concentration of amorphous carbon, which were met by small metal catalyst particle inside the big tube, can occur outside the tube as well. Indeed, the outer tube surface is getting covered with a layer of amorphous carbon deposited from the gas phase, which is seen, for example, on the SEM image of the as-produced intact bundles presented in FIG. 4. Under appropriate temperature, which evidently occurs in the place near the arc where fibrous material is growing, a metal catalyst particle, which somehow enters this amorphous layer, will consume it and transform into a tube, thus propagating in the direction of zero gradient of feedstock concentration, that is along the tube or the bundle. The finding, that the catalyst particle does not dissolve the carbon from the tube walls (FIG. 5d) strongly supports this idea about the mechanism of bundles formation. The amorphous carbon layer on the tube walls is formed either by precipitation of amorphous particles from the gas phase or, predominantly, by dehydrogenation and condensation of hydrocarbons, when they are present in the gas phase. Obviously, the rate of amorphous carbon deposition and its amount depend on the presence of hydrogen in the gas phase. Thus the process of the tube growth should be greatly influenced by the amounts of hydrocarbon and hydrogen in the reactor, which behavior is actually observed and described in detail in EXAMPLES. Certainly, hydrocarbon and hydrogen have many other functions in the system. Hydrocarbon can directly react with the metal catalyst, providing it with dissolved carbon and evolving hydrogen into gas phase. This reaction can explain, for example, why the bundles are generally thinner and their branching is more frequent in hydrocarbon-containing systems.

This knowledge and conjectures were building blocks to study the effect of light hydrocarbons in the arc system for DWNT synthesis.

The total substitution of hydrogen for methane under otherwise retained conditions resulted in unstable operation of the arc and poor yield of nanotubes. However, when only a part of hydrogen in initial gas was substituted for methane, it became possible to conduct the arc process steadily, and the nanotube products were generally much similar to those obtained under optimal conditions in the $H_2$/Ar system, both in quantity and quality of DWNTs as exemplified below in "EXAMPLES". The presence of some hydrogen in the initial gas is, first of all, necessary to ensure stable and efficient vaporization of anode, although hydrogen functioning in the system is obviously more versatile.

The conjecture about probable active role of hydrocarbons in DWNTs synthesis has prompted us to explore the implementation of the catalyst, found herein to be active in the arc process, in the CCVD systems. We have found, in accordance with present invention, that DWNTs are copiously formed in a conventionally organized CCVD processes, utilizing the catalyst close in composition to that employed in the arc process, described in EXAMPLE 1 and the hydrocarbons found in the atmosphere of the arc reactor, and performed in the temperature range 1250-1300° C. Both supported metal catalyst and floating catalyst methods have been successfully employed for the DWNT synthesis as exemplified in detail below in EXAMPLES 8 and 9.

Lead by the same consideration concerning hydrocarbon utilization in DWNT synthesis, we explored an alternative technique of providing the heat to the reaction zone of a pyrolysis process. We have employed the hot high frequency plasma to effect the pyrolysis of hydrocarbon gas in the presence of a catalyst dispersed in the gas phase. The pulverized "optimal for arc DWNT" catalyst was introduced into methane-hydrogen-argon gas mixture flowing through the hot inductively coupled plasma, where the catalytic pyrolysis occurs. In the second plasma-assisted variant, the floating catalyst process was arranged by injecting benzene solution of catalyst precursors into, the gas stream entering the reaction zone, as described in detail in Examples 11 and 12. In both variants the product was rich in DWNTs, and was obtained at a rate much exceeding that for similar laboratory scale size arc and chemical CVD apparatuses used herein.

Each of three techniques for DWNT synthesis, including arc discharge, thermal CVD and plasma-assisted CVD methods, presented in the invention, have good prospects for scaling-up to a mass production level, which are emphasized in EXAMPLES.

Figure 19:
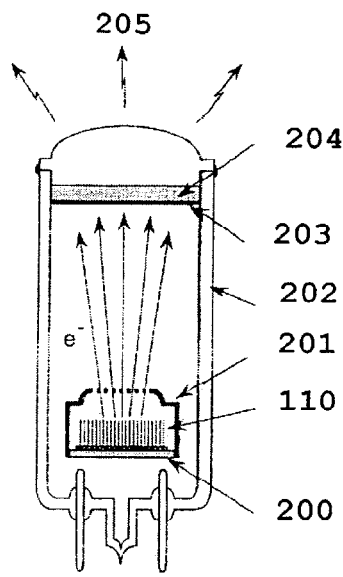
FIG. 19. Shows a schematic of cross-section of CRT light emitting element with carbon nanotubes field emitters employed as the electron emitting cathode in accordance with the present invention, as described in Example 13.

In this invention the DWNT's were also employed as electron field emitters having generally uniform distribution of emissive surface as result of their production in high yield. The electron field emitter cathodes of the invention provide uniform electron emission, have low electric field requirements, high emission current, and can sustain stable electron emissions without any notable diminution in current for a long-term. Pristine DWNTs fibrous fragment (0.05-0.10 mm diameter. 1-2 mm long), picked up by tweezers from the as produced deposit was employed for measuring the field emission characteristics. The FED type (field emission display) elements were employed for examining the performance of nanotubes field emitters. These elements were constructed with the configuration and internal component typical for CRT (cathode-ray tube)-type lighting elements. CRT lighting elements (light bulbs) equipped with hot filament cathodes is now used practically as element of outdoor giant displays. In the present experiment, as described in EXAMPLE 13, the filament cathodes are replaced with nanotubes cold cathodes. All parts other than cathodes are the same as those routinely used for manufacturing the lighting elements as described in Uemura S. Seko 'V. Kamogawa H. Morikawa M. Shimojo T. ITE Tech Rep 1993:17:31-6. The DWNTs produced according to this invention were directly glued onto a stainless steel plate (FIG. 19, cathode of a CRT, 200) by using a conductive paste. The DWNT deposits (approximately 4 mm×4 mm) were sliced into thin substrate with a thickness of 0.5-1.0 mm using a dicing device. A sliced cathode was glued to a stainless steel plate (5×5 $mm^2$, 0.15 mm in thickness) using silver paste. The glued cathode materials were baked at 450-500° C. in air to cure the silver paste. Field emitters of carbon nanotubes (FIG. 19, carbon nanotubes, 110) were covered with a grid electrode (FIG. 19, grid, 202) that controls the emission of electrons from nanotubes. Both the cathode and the grid were fixed on a ceramic board. The distance between the nanotubes tips and the grid, $d_{T-G}$, was 0.2-1 mm using ceramic spacer (FIG. 19 spacer 201). After the first trial fabrication, several techniques were examined to fix carbon nanotubes onto the cathode surface, and the technique of screen-printing was found to be the most effective for industrial application. Fibrous materials containing DWNTs were crushed and mixed with pastes and slurries. When using this technique, the density of DWNTs on the cathode surface can be adjusted by adding conductive filler and binder to the paste.

After being printed with the paste the cathode was heated at 450-500° C. in air to form electrical and mechanical contact between the DWNTs and the substrate and vaporize the binder. The vacuum tube is then sealed and a getter material is flashed to attain a high vacuum the order of $10^{-8}$ torr.

Figure 20:
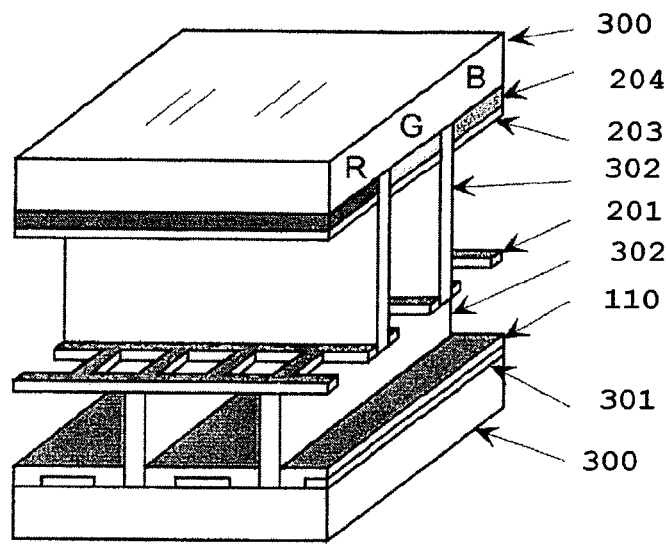
FIG. 20 is a graphical representation of emission current versus grid voltage for cathodes prepared from DWNT in accordance with the invention as compared with MWNT.
Figure 21:
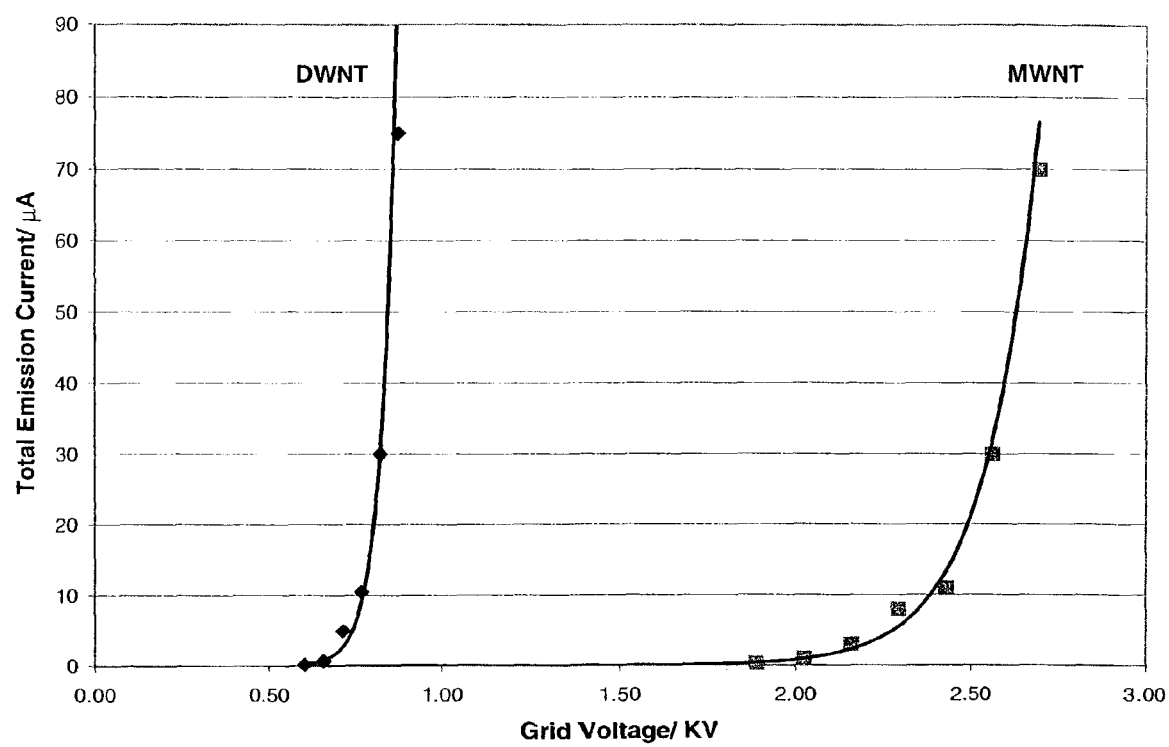
FIG. 21. life test of a CRT light emitting element showing emission current (total, anode and grid) in µA as a function of time in hours for a fixed anode voltage in accordance with the invention.

The nanotubes cathode is grounded (0 V), and the control grid is biased to a positive voltage (in the range of 0.2-3.0 kV) to extract electrons from nanotubes tips. FIG. 20 shows the total current emitted from the nanotubes (DWNT as compared to MWNT) cathodes as a function of the voltage applied to grid. For $d_{T-G}$=0.5 mm the total emission current of over 400 µA was obtained at the grid voltage was 900 V. Namely, the current density on the cathode surface (effective area being about 2 $mm^2$) was approximately 20 mA/$cm^2$ at average field strength of less than 1.8 V/µm. MWNT tested under the same condition has an average field strength of over 4 µm. These results are certainly a significant improvement over MWNT performance. The DWNT-based CRTs were also tested for long term stability and a typical time trace of the total emission current at a fixed grid voltage is shown in FIG. 21, exhibiting a stable emission with a fluctuation of less than 4% at an average anode current of 120 µA after initial stabilization. A sustainable stable electron emission without any notable diminution in current for a long-term operation of over 1200-h was achieved. The use of the material and method of production of the materials of this invention can provide for a material with a significant long-term stability improvement over the performance of SWNT.

The robust and stable nanotubes emitters can be contrasted with delicate and sensitive metal emitters such as those produced with tungsten and molybdenum. For the metal field emitters, ultrahigh-vacuum conditions ($10^{-10}$ Torr) are indispensable to sustain FE. Contrary to metal emitters, it is quite surprising that the carbon nanotubes emitters operate stable even in moderate-vacuum conditions (no need for an ultrahigh vacuum). This reliable operation is presumably due to the chemical inertness, absence of melting point, and mechanical strength of carbon nanotubes.

DESCRIPTION OF PREFERRED EMBODIMENTS

The following examples describe in detail the preferred embodiments of the present invention, with description of the apparatuses, processes, procedures and results of particular and representative runs and products been given. The detailed description falls within the scope of, and serves to exemplify the more generally described process set forth above. The examples are presented for illustrative purposes only, and are not intended as a restriction on the scope of the invention.

Example 1

Figure 2:
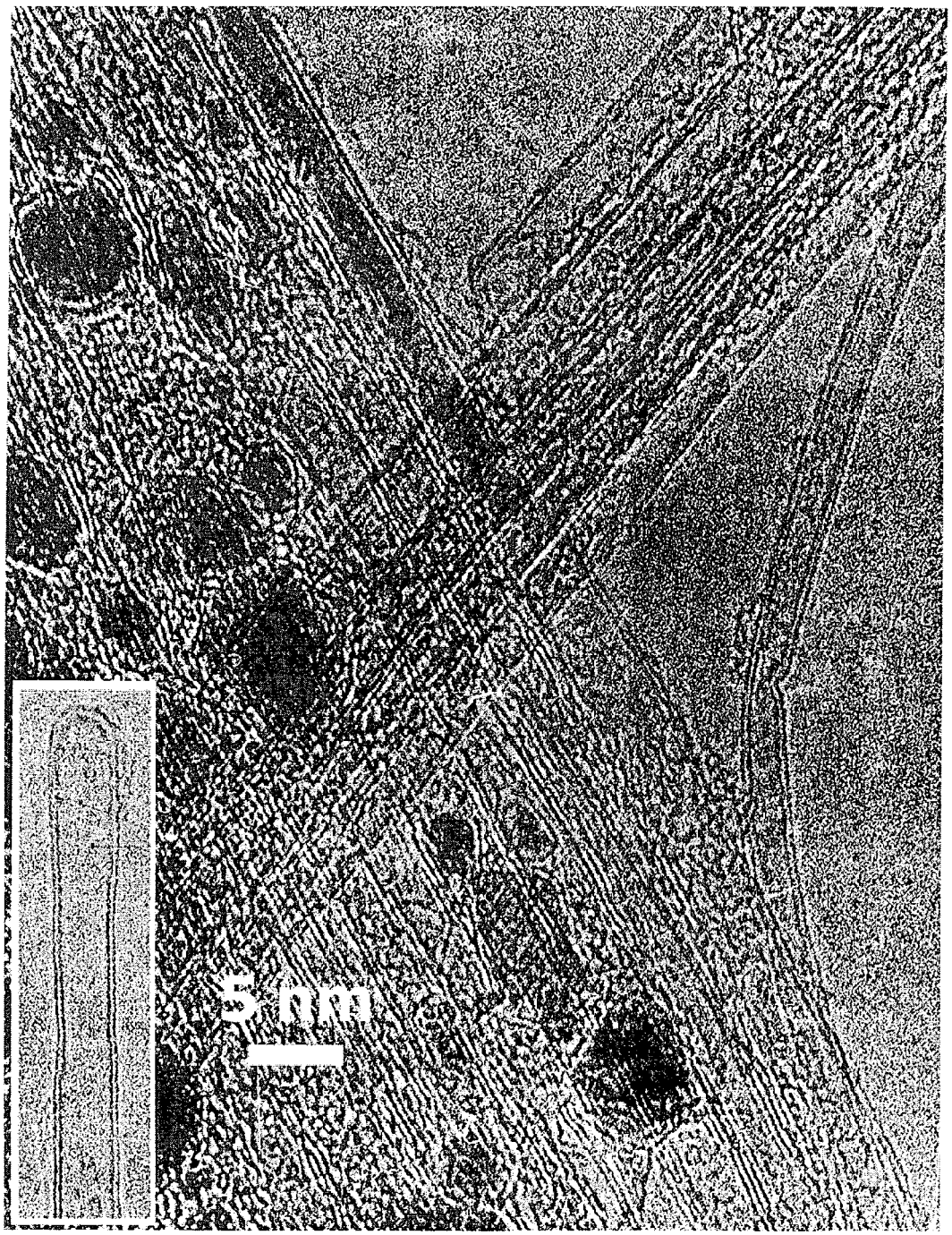
FIG. 2 is a typical high-resolution transmission electron microscope micrograph of the as-produced fibrous material obtained in the arc-discharge process under optimal conditions for DWNT production described in EXAMPLE 1 of the present invention. Dark spots are metal catalyst particles. Shown on the insert is a DWNT end having a double-layer terminating cap of nearly hemispherical shape.
Figure 3:
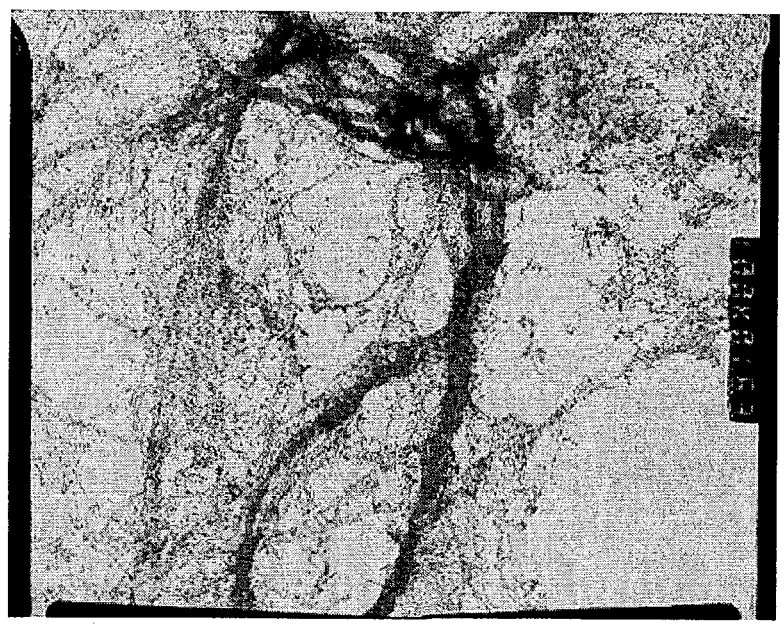
FIG. 3 is a typical low-resolution transmission electron microscope micrograph of the as-produced fibrous material obtained in the arc-discharge process under optimal conditions for DWNT production described in EXAMPLE 1 of the present invention. Bundles and ropes of DWNTs with a few separate tubes are present.
Figure 4:
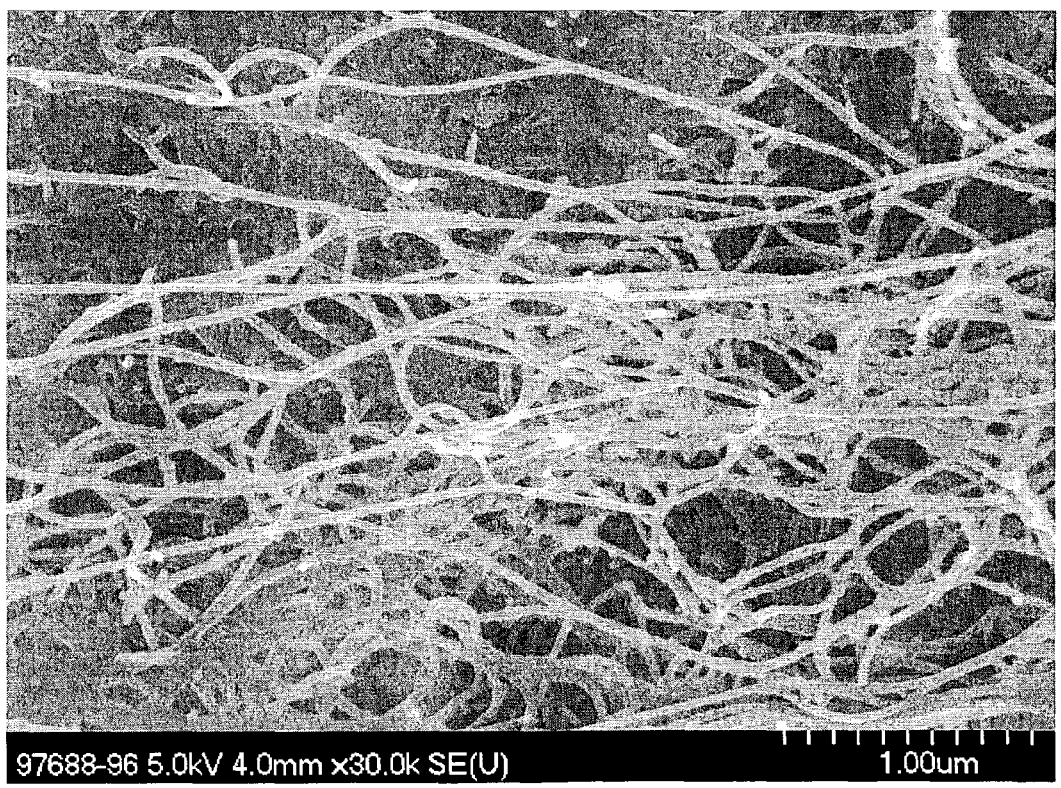
FIG. 4 is a typical scanning electron microscope micrograph of the as-produced fibrous material obtained in the arc-discharge process under optimal conditions for DWNT production described in EXAMPLE 1 of the present invention.

This example presents optimized conditions for high yield of DWNTs.
Preparation of the catalyst. The mixture of fine metal powders of iron (81.0 g, 2-5 µm particle size), cobalt (41.3 g, 2-5 µm), nickel (152.6 g, 2-5 µm) and elementary sulfur (24.1 g) is heated to 750 C at a rate 30 C/min and maintained at this temperature for 30 min in the flow of $H_2$ (20 sccm) and He (30 sccm) at atmospheric pressure in a quartz tube 80 mm in diameter, then cooled down to room temperature. The resultant strong crisp lump of greenish-brown color is ground in a ball mill to a powder with particle size ca. 1-2 µm. This powder is mixed with 75.0 g of fine graphite powder (SUPERIOR GRAPHITE, BG-34).
Preparation of consumable anode. A graphite rod 210 mm long, 7.93 mm in diameter and of 1.78 g/cm$^3$ density is drilled to 200 mm depth along the axis with a drill 3.18 mm in diameter, and the resultant hole is densely packed with 5.5 g of the catalyst prepared as described above. The calculated cross-section composition of the anode obtained is 77.3% graphite+6.1% Fe+3.1% Co+11.6% Ni+1.8% S.
Conditions of the arc process. FIG. 1 shows a reactor 101 of a type typically used to produce fullerenes and which is suitable for producing double walled nanotubes in accordance with the present invention, as described in EXAMPLE 1. The reactor 101 comprises a reaction chamber 102 formed by a generally tubular quartz column 103 having upper and lower lids 104,105 having respective upper and lower circular seals 106,107 whereby an effective vacuum or reduced pressure can be maintained in the chamber by means of a pressure controlling system 108. A gas supply system 109 is provided for introducing into the chamber a mixture of gases, each gas at a pre-selected rate. An arc discharge system comprising upper and lower electrodes 110 and 111 is connected to an electric power source for energizing an electric arc produced in the gap between the electrodes 110 and 111. As indicated schematically by the legend "H$_2$O" and adjacent arrows, the mechanical systems for supporting and moving the electrodes 110,111 are provided with water cooling systems in conventional manner. A mechanical system shown as the anode feed 112 is maintaining the arc gap width at a constant value provided the arc current and the feed rate both are constant during the arc operation. The electrodes are installed vertically, with anode rod 111 in the lower position. Cathode is a graphite cylinder 10-mm in diameter and 15 mm long positioned co-axially with the anode. During the run the electrodes are approaching to each other along their common axis with a constant linear rate (feed rate) equal to 1.0 mm/min. The total pressure in the water-cooled quartz reaction chamber (3.2-Liter in volume) is maintained during the run equal to 400 Torr. Partial pressure of hydrogen is 150 Torr and that of argon is 250 Torr. Hydrogen and argon gas flows through the reactor (from the top to the bottom) are 300 sccm and 500 sccm, correspondingly. Cathode is rotating with an angular rate 2 rpm. A tungsten knife 113 is continuously scraping away the fibrous material formed mainly on the cathode assembly during the run, thus maintaining the space around the arc free of fibers, that tend otherwise to block this space. This blockage causes overheating of the arc space, the increase of the gap width, and unstable operation of the arc. The scraped away fibrous material is accumulated at the bottom 111 of the reactor. Arc current is maintained constant during the run and equal to 80 A. The voltage drop across the gap (total voltage measured minus voltage drop on anode rod and cathode deposit) is equal to 23-26 V. The gap width is 1.5-2.0 mm during the run.
Products of the arc synthesis. The fibrous material collected from the bottom of the reactor and from the cathode surface is separated from small fragments of cathode deposit and from powdery soot and small balls of metal catalyst (~0.2 mm in diameter) manually and by vibrating on a 30 mesh sieve. The yield of thus obtained strong fibrous material is 1.1 g, that is, 6.2% of the weight of the anode consumed (17.8 g). The fibrous material is ferromagnetic and contains ca. 20 wt. % of metal catalyst nanoparticles, according to data of chemical and transmission electron microscopy (TEM) analyses. The rest of fibrous material (ca. 0.9 g) is represented by DWNTs (ca. 75%, that is ~0.7 g, 3-4 nm in outer diameter), thick SWNTs (ca. 3%, 3-4 nm in diameter) and amorphous carbon and other poorly structured carbon species (ca. 20%). These values are assessed through examination of fibrous material by high-resolution TEM (a representative micrograph is shown in FIG. 2), low-resolution TEM (FIG. 3) and SEM (FIG. 4). The bundles of carbon nanotubes in as-produced material are covered with a layer of amorphous carbon (FIG. 4), that is removed from the tube surface by ultrasonic treatment in the course of samples preparation for TEM observations, as revealed by FIGS. 2 and 3.

The carbon deposited on the inner surface of quartz chamber is a continuous dense layer about 0.5 mm thick, that is easily peeled off of the quartz wall as kind of inner lining of a sleeve. This "wall sleeve" material is combined with some leaf-type carbon collected from the surfaces of upper and lower lids and subjected to vibration on the 30 mesh sieve to remove some sooty powder and small particulates. This procedure yields 2.1 g (11.8% of the consumed anode) of pure "wall sleeve". The DWNTs and thick SWNTs content amounts to ca. 10% and 0.5% of the weight of this wall sleeve, correspondingly, that is much lower than their content in the fibrous material. The rest of wall sleeve consists of metal catalyst particles (ca. 20%) and various forms of amorphous and poorly structured carbon, according to HRTEM assessment, FIG. 5 is a micrograph of the wall sleeve.

Total weight of the powder sieved through 30 mesh copper grid amounts to 4.9 g (28% of consumed anode). This powder contains negligible amount of tubes (less than 3%), metal catalyst particles ranging from a few nm to ca. 0.5 mm in diameter (ca. 35%), amorphous and poorly structured carbon (ca. 60%), as estimated by various techniques.

The cathode deposit cylinder (FIG. 1) is 95 mm long and 9 mm in diameter. Its weight is equal to 8.7 g (49% of consumed anode). It does not contain any DWNTs or SWNTs, and consists of a hard outer shell and relatively softer inner core. The core contains graphite microparticles, bucky-onions, poorly structured carbon and some MWNTs. Small amount of metal catalyst particles is present in the core and in the shell of the deposit.

The weight of the remainder of the anode is 1.6 g and its length is 19 mm.

The material balance of the process is lacking 0.7 g of initial anode weight. This amount of carbon can be tentatively assigned to methane and other hydrocarbons formed during the process and blown out of the reactor by the flow of argon and hydrogen mixture.

Example 2

This example demonstrates the negative effect of deviation from the optimal value of the total pressure on the yield and quality of DWNTs.

The catalyst and experimental conditions are the same as in EXAMPLE 1, except that total gas pressure in the chamber was maintained equal to 700 Torr during the process.

As a result, the yield of fibrous material has dropped down to 0.18 g (ca. 1.0% of consumed anode). These fibers are weak and easily disintegrate into a powder by crinkling in fingers. The content of DWNTs and SWNTs in the fibrous material is about 5%, the rest is mainly amorphous carbon and metal nanoparticles. The ration DWNTs/SWNTs in the fibrous material is about 1. The wall sleeve is very loose and powdery. It contains about 1% of carbon nanotubes, DWNTs and SWNTs.

Example 3

This example demonstrates the negative effect of deviation from the optimal value of electric current on the yield and selectivity of DWNT production.

Conditions are the same as in EXAMPLE 1, except that electric current value was maintained equal to 75 A.

Figure 6:
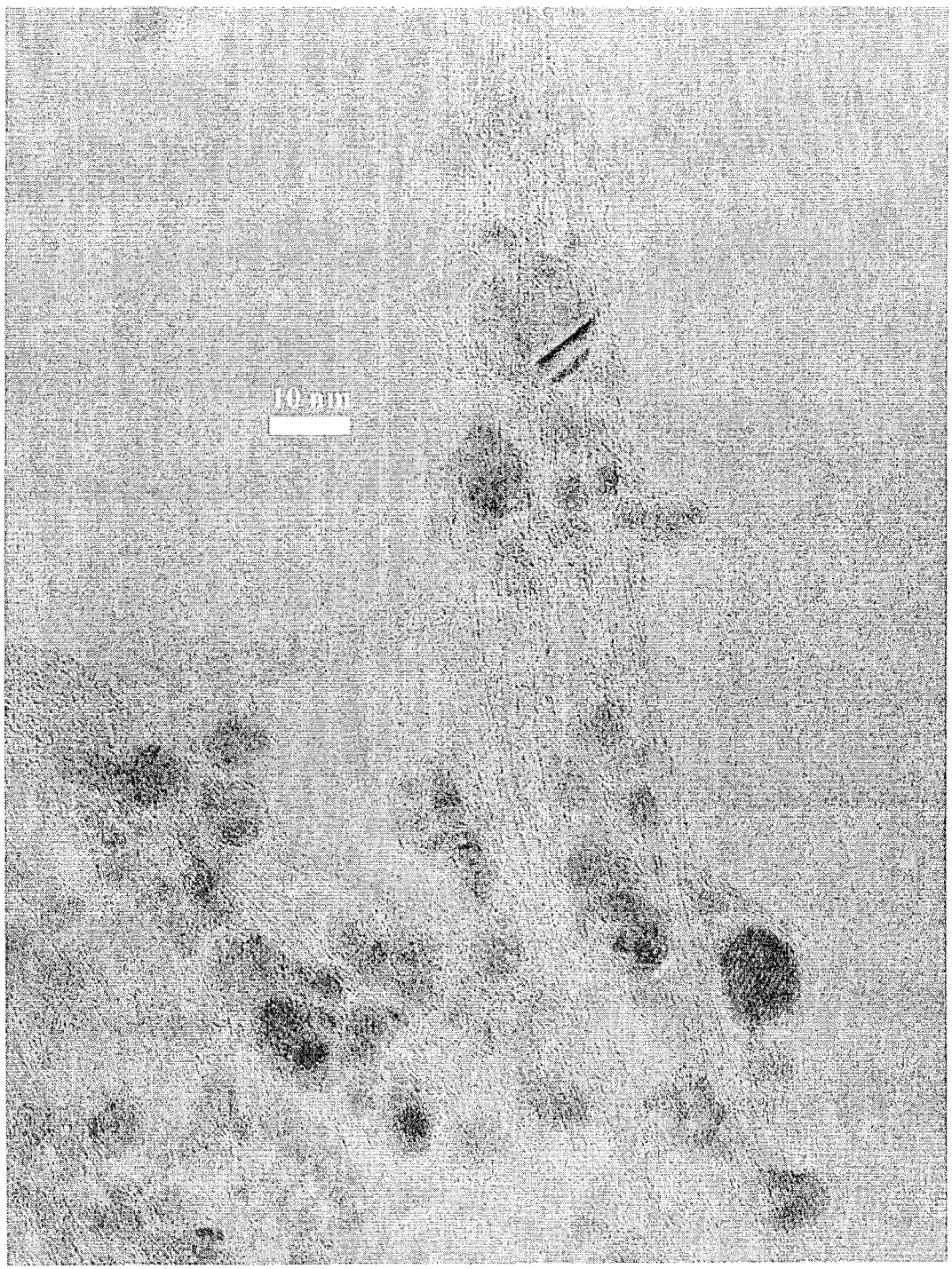
FIG. 6 is a typical high-resolution transmission electron microscope micrograph of the as-produced fibrous material obtained in the arc-discharge process under conditions described in the EXAMPLE 3 of the present invention.

As a result, the yield of fibrous material is 0.65 g (ca. 3.5% of consumed anode). The total yield of DWNTs and SWNTs in the fibrous material is about 60%, the rest is amorphous carbon and metal nanoparticles (FIG. 6). The amount of DWNTs and SWNTs is about equal in the sample of the fibrous material. The same is observed in the wall sleeve material, the ration DWNTs/SWNTs is about 1.

Example 4

This example demonstrates the negative effect of deviation from the optimal ratio of hydrogen to argon in the gas mixture on the yield and selectivity of DWNT production.

Conditions are the same as in EXAMPLE 1, except that partial pressures of hydrogen and argon have been maintained equal to 80 Torr and 320 Torr, correspondingly, by adjusting the flow rate for hydrogen equal to 160 sccm and that for argon equal to 640 sccm, while retaining the total gas pressure equal to 400 Torr.

Figure 7:
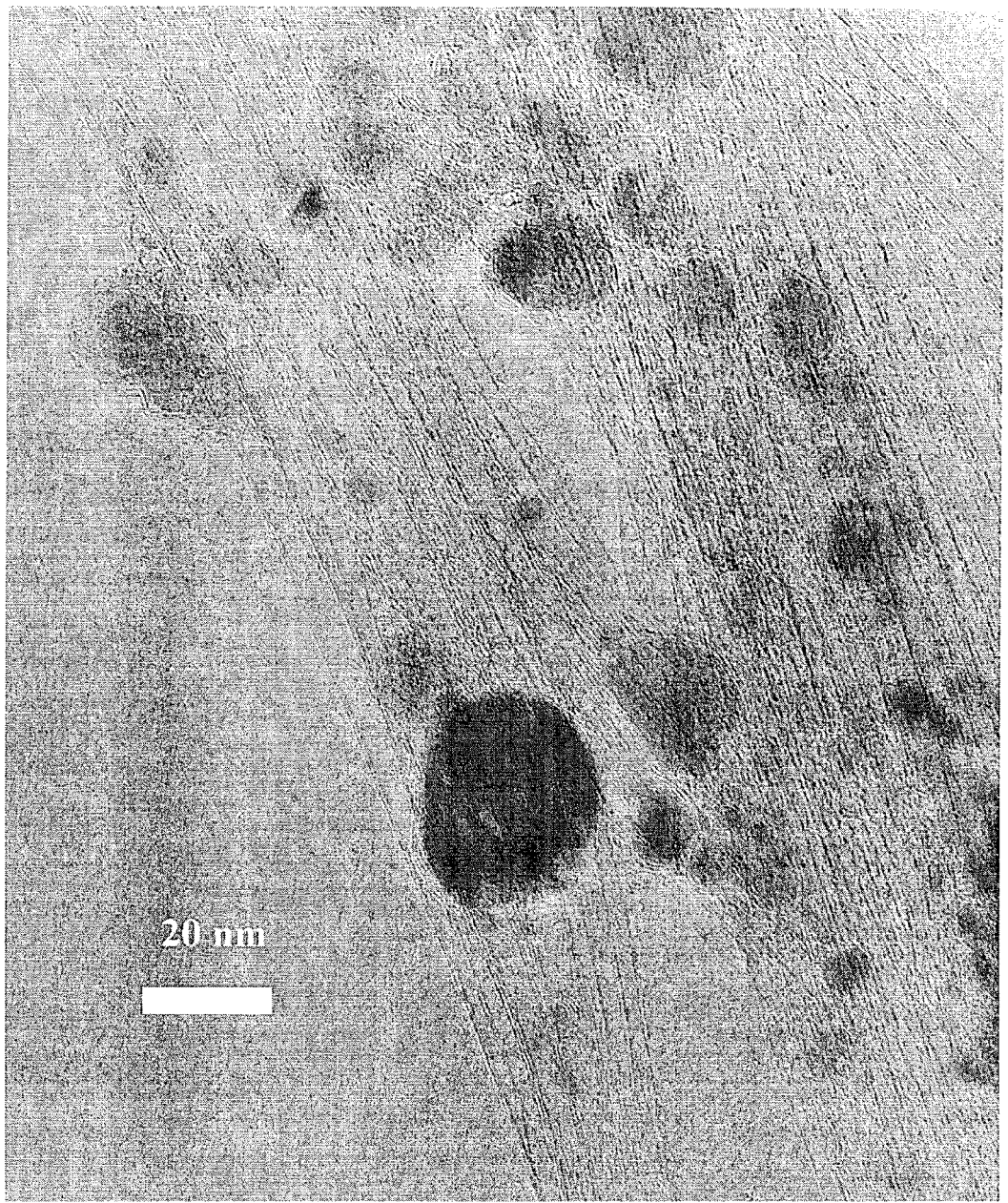
FIG. 7 is a typical high-resolution transmission electron microscope micrograph of the as-produced fibrous material obtained in the arc-discharge process under conditions described in the EXAMPLE 4 of the present invention.

As a result, the yield of fibrous material is 0.88 g (ca. 5.0% of consumed anode). The amount of DWNTs and SWNTs in the fibrous material is about 70%, the rest is amorphous carbon and metal nanoparticles. The ration DWNTs/SWNTs is about 3.0, that is one SWNT is observed per each three DWNTs on the HRSEM micrographs (FIG. 7).

It is of note, that the change in the $H_2$/Ar ration causes the change of other process parameters, for example, of the gap width, which might have appeared to be the main tool for changing the selectivity of DWNT production.

Example 5

This example demonstrates the negative effect of deviation from the optimal procedure of the catalyst preparation on the yield and selectivity of DWNT production.

Fine metal powders of iron, cobalt, nickel and sulfur are taken in the same proportion as in EXAMPLE 1 and thoroughly mixed. The heat treatment of this mixture at 750 C, described in EXAMPLE 1, is omitted. This is the only distinction of the preparation procedure from that described in EXAMPLE 1. Thereafter the mixture is combined with graphite powder (SUPERIOR GRAPHITE Co, BG-34) in the proportion 4:1, in accordance with EXAMPLE 1, as well as all subsequent steps described therein. The calculated cross-section composition of the anode thus obtained coincides with that presented in EXAMPLE 1.

The arc experiment conditions are the same as in EXAMPLE 1

Figure 8:
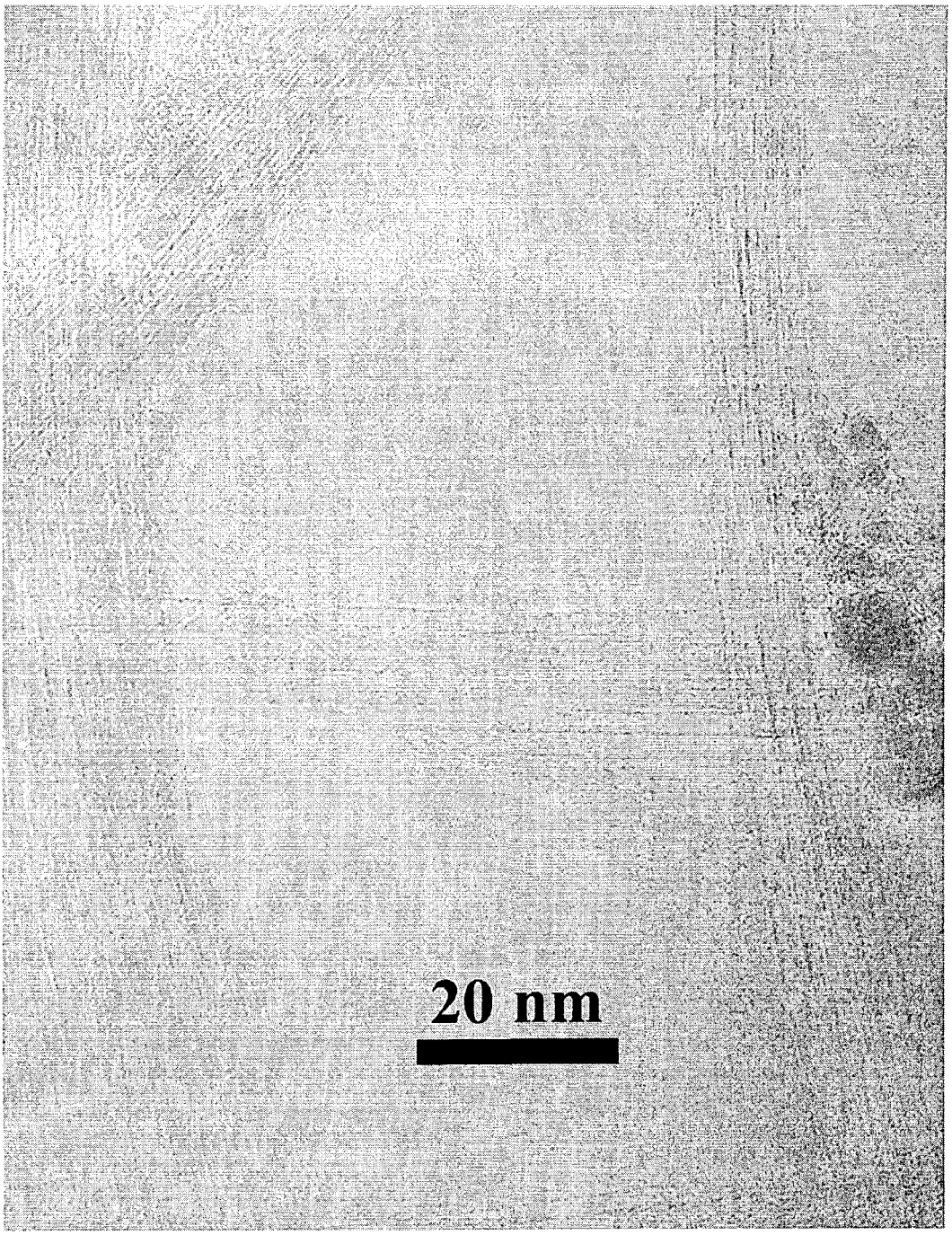
FIG. 8 is a typical high-resolution transmission electron microscope micrograph of the as-produced fibrous material obtained in the arc-discharge process under conditions described in the EXAMPLE 5 of the present invention.

The weight of fibrous material obtained is 0.95 g, which practically coincides with that in EXAMPLE 1. But the ration DWNT/SWNT is equal to about 0.1, that is the number of SWNTs observed on the micrographs surpass that of DWNTs by an order of magnitude (FIG. 8). Besides the very occurrence of the abrupt change in the selectivity for DWNT production, this example demonstrates that controlling of DWNT/SWNT ration in a very wide range is quite feasible.

Example 6

This example shows that relative amount of metals in the catalyst determines the selectivity of the process.

Figure 9:
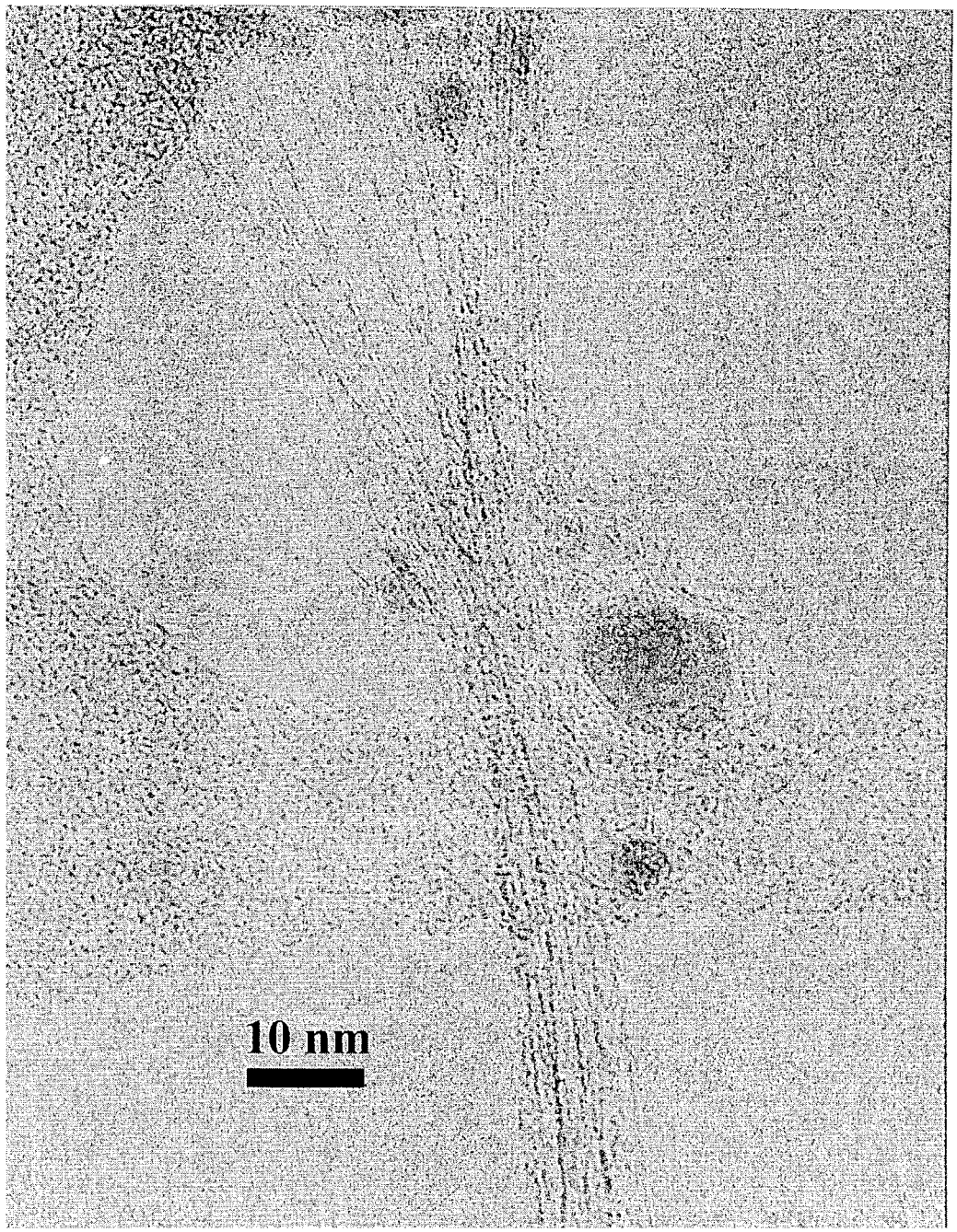
FIG. 9 is a typical high-resolution transmission electron microscope micrograph of the as-produced fibrous material obtained in the arc-discharge process under conditions described in the EXAMPLE 6 of the present invention.
Figure 10:
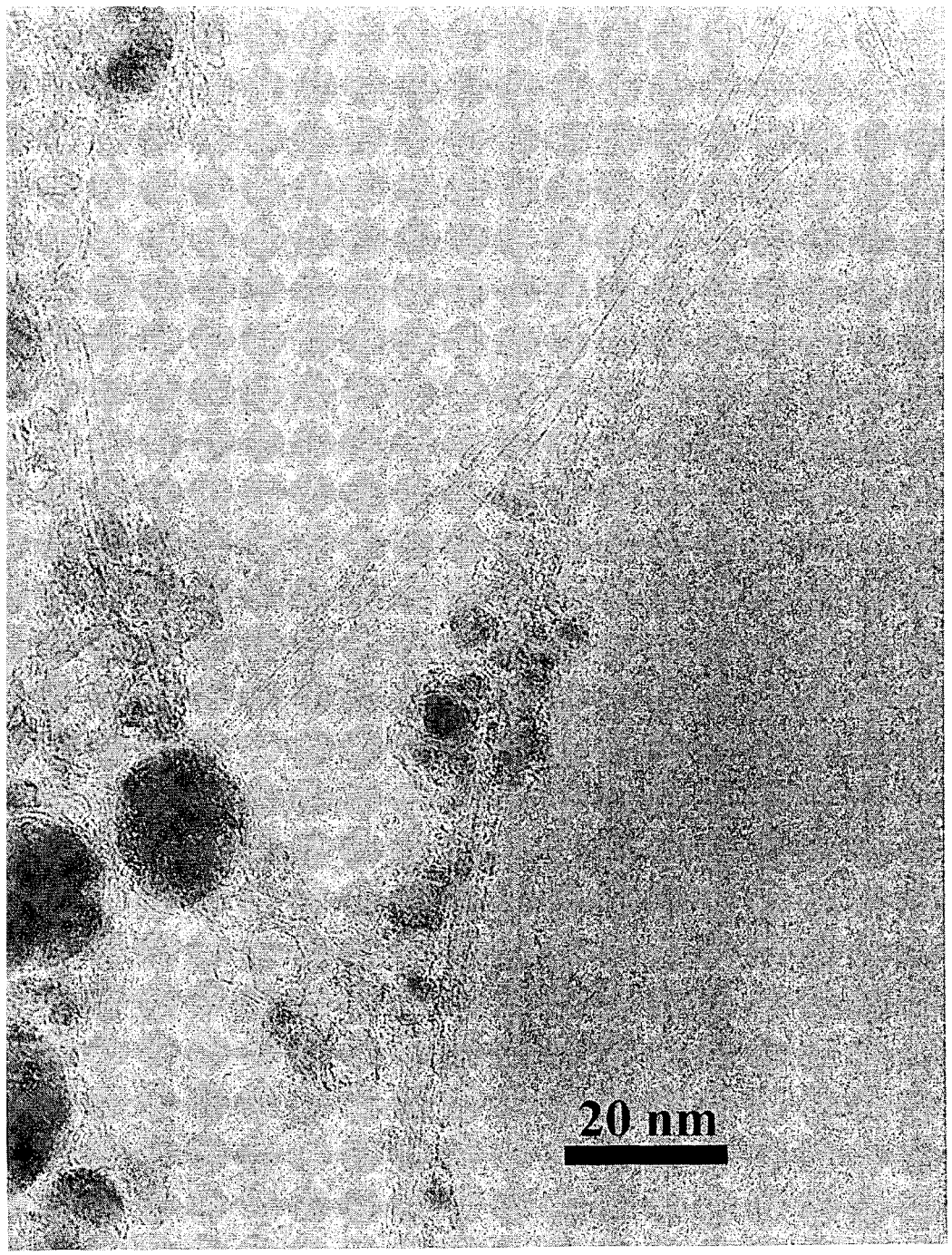
FIG. 10 is a typical high-resolution transmission electron microscope micrograph of the as-produced fibrous material obtained in the arc-discharge process under conditions described in the EXAMPLE 7 of the present invention.
Figure 11:
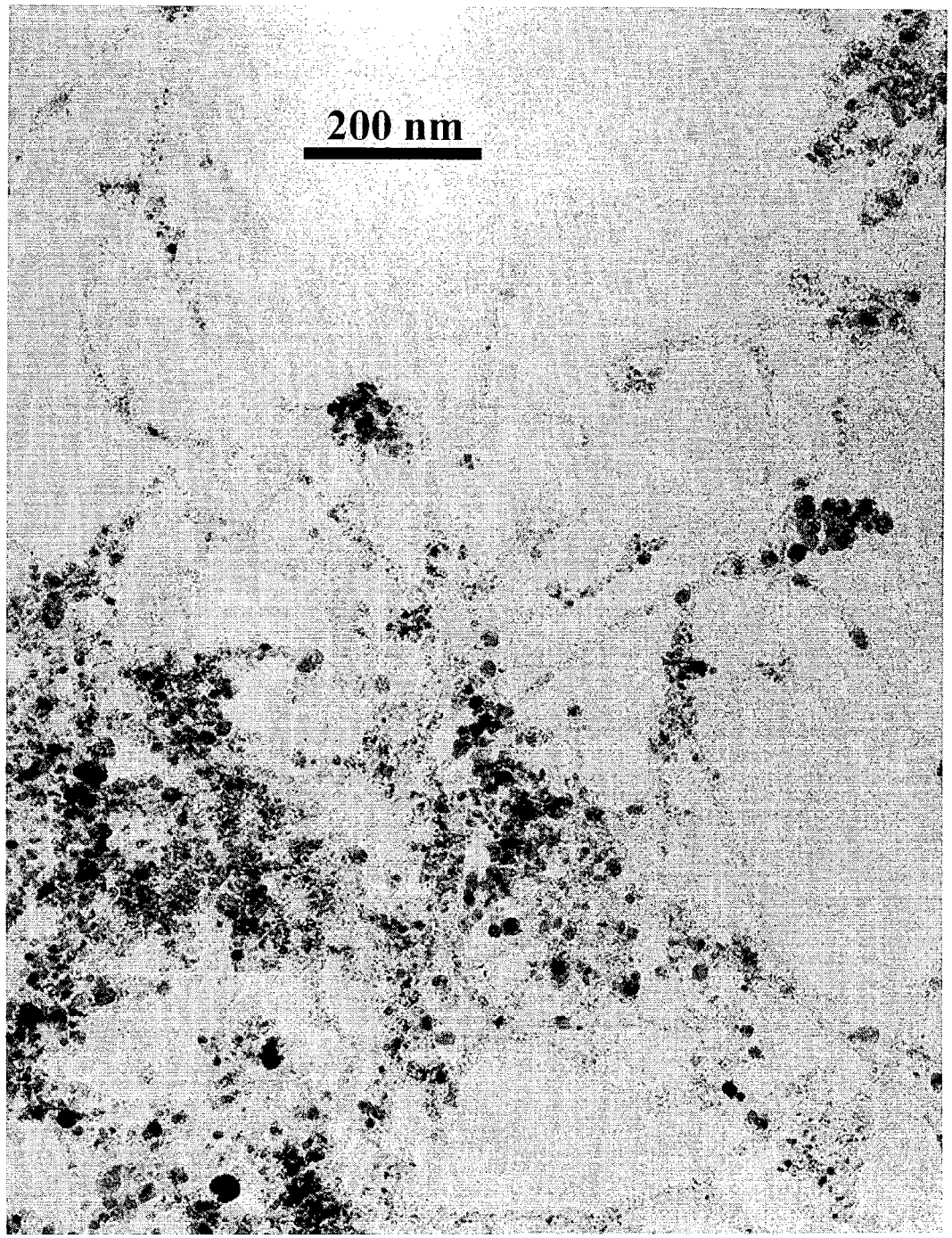
FIG. 11 is a typical low-resolution transmission electron microscope micrograph of the as-produced fibrous material obtained in the arc-discharge process under conditions described in the EXAMPLE 8 of the present invention.

The general scheme of catalyst preparation was retained from EXAMPLE 1, while the relative amounts of components have been changed to obtain a catalyst of the following elementary composition: Fe (17.3%), Co (27.3%), Ni (9.1%), S (9.9%), C (36.4%), which corresponds to the molar ration Fe:Co:Ni:S=2:3:1:2. After filling the hole in the anode with this catalyst, the calculated cross-section composition of the anode is 88.7% graphite+3.1% Fe+4.8% Co+1.6% Ni+1.8% S. Vaporization of this anode in the arc under conditions of EXAMPLE 1 has produced 0.92 g of fibrous material (5.2% of consumed anode). The yield of carbon nanotubes in fibrous material is ca 60%. Amount of DWNTs in fibrous material is very small, and SWNTs are dominant product (FIG. 9). The ration DWNTs/SWNTs is less than 0.1. The catalyst used has thus enabled obtaining the relatively pure thick SWNTs in high yield. This result proves that composition of the catalyst is a handy tool for controlling the selectivity of the process toward certain kind of tubes Example 7

This example illustrates that sulfur is moderately important for efficient synthesis of DWNTs.

The mixed catalyst was prepared from iron, cobalt and nickel powders, taken in the same as in EXAMPLE 1 relative amounts, while elementary sulfur was not added to the mixture. The calculated cross-section composition of the composite anode rod was 79.7% graphite+6.0% Fe+3.0% Co+11.3% Ni.

The externally controlled conditions for running the arc process were identical to those used in EXAMPLE 1. The weight of fibrous material obtained was 0.72 g (ca. 4.0% of consumed anode). Carbon nanotubes, DWNTs and SWNTs, are present in fibrous material at a level of 40%, the rest is amorphous carbon and metal particles. The number of DWNTs encountered on HRTEM micrographs (FIG. 10) is half as much that of SWNTs, that is the ration DWNTs/SWNTs=0.5. Approximately the same value of this ration is characteristic of a wall sleeve sample, while the yield of tubes in the wall sleeve is substantially lower (ca. 5%) than that in fibrous material (ca. 40%). Thus, the presence of sulfur is not crucial for abundance of DWNTs in the products of the arc synthesis. Meanwhile, certain amount of sulfur co-catalyst seems to be necessary to attain as high yield and selectivity for DWNTs as those presented in EXAMPLE 1.

Example 8

This example shows that hydrogen gas can be replaced for a light hydrocarbon, while retaining efficient DWNTs production.

The optimal conditions of EXAMPLE 1 are employed, except that 80% of hydrogen is replaced for methane and b) the arc current is increased to 85 A. Thus the flow rates of gases were adjusted to values 240, 60 and 500 sccm for methane, hydrogen and argon, correspondingly.

The yield of fibrous material turned out to be 1.25 g (7.0% of consumed anode) The total yield of tubes in the fibrous material was ca. 50% (FIG. 11), and the ration DWNTs/SWNTs was ca. 15. Thus the selectivity and the rate of DWNT production remained largely unchanged upon administration of methane to the gas system of the process, compared to $H_2$/Ar gas mixture. It is noteworthy, that a complete exclusion of hydrogen from the feed gas gave poorer yield and selectivity for DWNTs.

Example 9

Figure 12:
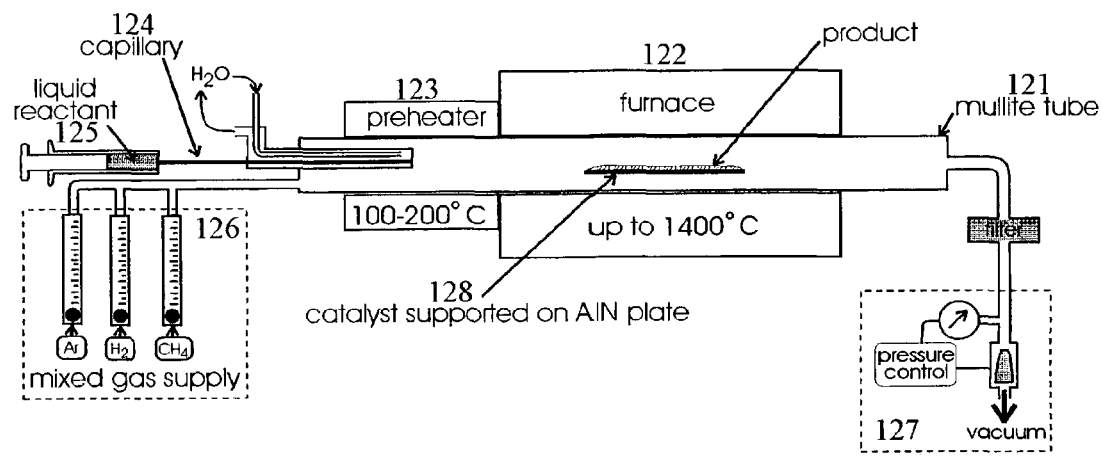
FIG. 12 is a schematic representation of a tubular flow reactor for performing CCVD of hydrocarbons for DWNTs according to present invention wherein the supported catalyst is used under conditions described in the EXAMPLE 9 of the present invention.

This example presents the DWNT production performance of methane pyrolysis over a supported metal catalyst in a flow reactor heated by resistive furnace, as illustrated in FIG. 12.

FIG. 12 shows a mullite tube reactor 121 inside a tubular furnace 122 developing in the central reaction zone the temperature 1250 C during the run, as controlled by external Pt/Pt—Rh thermocouple. The pre-heater furnace 123 is maintained at 150 C to vaporize liquid thiophene drown into reactor through a capillary 124 by a mechanically driven syringe 125 at a rate 0.5 ml/h during the run. The end of the capillary has a water-cooled jacket to ensure uniform delivery of liquid to the center of pre-heater and to prevent the possible blocking-up of the nozzle by the solute precipitation, in the case, when the liquid is a solution of a solid. The gas flow control unit 126 delivers methane, hydrogen and argon at rates 200, 600 and 800 sccm, correspondingly, during the synthesis. The pressure controlling system 127 maintains the total pressure in the reactor equal to 780 Torr during the run. An aluminum nitride plate 128 (1×20×50 mm³) with the supported on the upper side catalyst is positioned in the center of high-temperature furnace 122. The nano-disperse catalyst with mass ratio of metals Fe/Co/Ni=29%/15%/56% was prepared from the wall sleeve produced in the arc process of DWNT synthesis under conditions of EXAMPLE 1, as follows. The wall sleeve product, containing nanotubes and other forms of carbon along with metal catalyst particles, was subjected to oxidation in air at 600 C for two hours to burn off the carbon component. The remaining metal oxides were ground and dispersed by ultrasonic treatment in iso-propanol to the state of viscous slurry, which was applied by a brush to one side of MN wafer and dried at 100 C. The amount of thus deposited catalyst was about 12 mg.

Reduction of the catalyst to the metal state was performed just before the synthesis by passing through the reactor 121 the mixture of 10% $H_2$ and 90% Ar for 1 h at low enough temperature 500 C to prevent coalescence of metal particles. Then hydrogen flow was shut down, and the temperature was set to rise to the working value 1250 C with pure argon in the reactor during about 20-min. When the temperature was stabilized at 1250 C, the thiophene delivery was first adjusted to the working value 0.5 ml/h and then simultaneously the working feed rates of all three gases were effected. The synthesis was run for 15 min, then thiophene delivery and methane and hydrogen flows were shut down, and the reactor cooled down to room temperature in an argon atmosphere.

Figure 13:
FIG. 13 is a transmission electron microscope micrograph of the product of the CCVD synthesis performed with the set-up presented on FIG. 12 under conditions described in the EXAMPLE 9 of the present invention. A thick bundle of tubes is shown.

The upper side of MN wafer with supported catalyst was covered with about 1 mm thick fibrous layer of a carbon deposit, 28 mg in weight, while deposition on the idle lower side and the reactor walls was much smaller. The product was scraped off the wafer by a razor and subjected to treatment with 6 N HCl and sonication to purify carbon component by removing most of metal catalyst. TEM examination has shown that DWNTs and thick SWNTs of about the same diameters (~4 nm) as observed in EXAMPLE 1, are abundant in the sample, and total amount of tubes is about one half that of amorphous and other forms of carbon. Nanotubes tend to aggregate into relatively thick bundles, one of which is shown in FIG. 13. The bundle consist both of DWNTs and SWNTs in about equal amounts, which ratio is characteristic as well for the rare separate tubes observed in the sample.

So, it became possible to regenerate the used catalyst and produce the tubes of the same size and kind under appropriate conditions, that essentially includes the presence of thiophene in the gas phase. In the absence of thiophene the amount of tubes was much lower, which implies that sulfur is important for restoring the activity of the catalytic particles. Further, it is assessed, that activity of the catalyst is of the same order of magnitude that of original catalyst in the arc system, which implies a temperature near 1250 C for the place where nanotubes grow in the arc, presumably, in the debris of fibrous material. This is further supported by finding that at a higher temperature 1380 C the present CVD system produces predominantly amorphous carbon. It should be stressed, that the choice of other working parameters is also important. For example, the CVD process which was run for a longer time (1 h) has resulted in more abundant carbon deposition, but this product was almost entirely the amorphous carbon. This is probably because of hindered diffusion of the gas phase feedstock to metal particles, which is effected after amorphous layer is grown thick enough. Accordingly, the non-catalytic decomposition of methane began to prevail, leading to copious amorphous carbon accumulation. So far, the employment of other feedstock gases, acetylene, ethylene and benzene, as well as the use of catalysts prepared by other means, generally give similar, but not any better production of DWNTs. Nevertheless, this CVD process is worthy of further tuning for the mass DWNT production, as the principles as more optimal conditions may quite be found and many promising options remain unexplored.

Example 10

This example presents the performance of a floating catalyst technique for DWNT production by pyrolysis of methane in a flow reactor heated by electric furnace.

Figure 14:
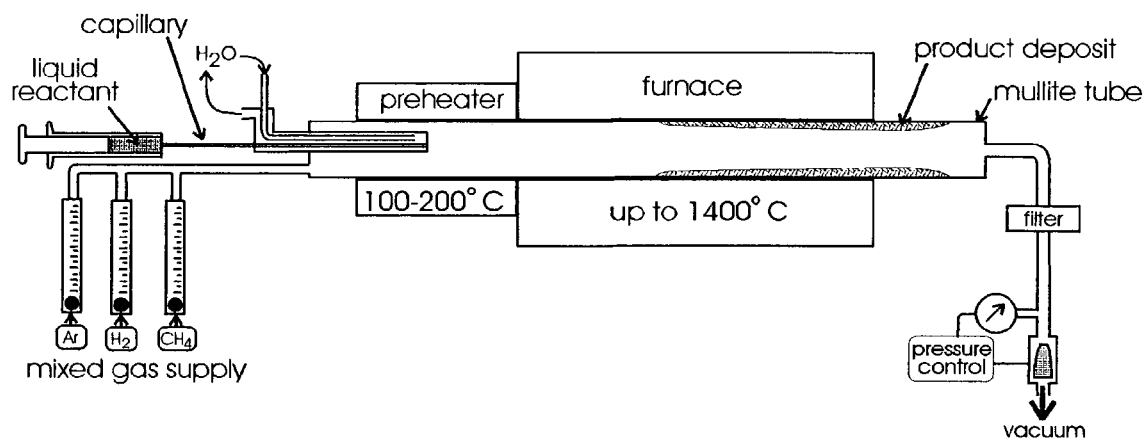
FIG. 14 is a schematic representation of a tubular flow reactor for performing CCVD of hydrocarbons for DWNTs according to present invention wherein the floating catalyst is used under conditions described in the EXAMPLE 10 of the present invention.
Figure 15:
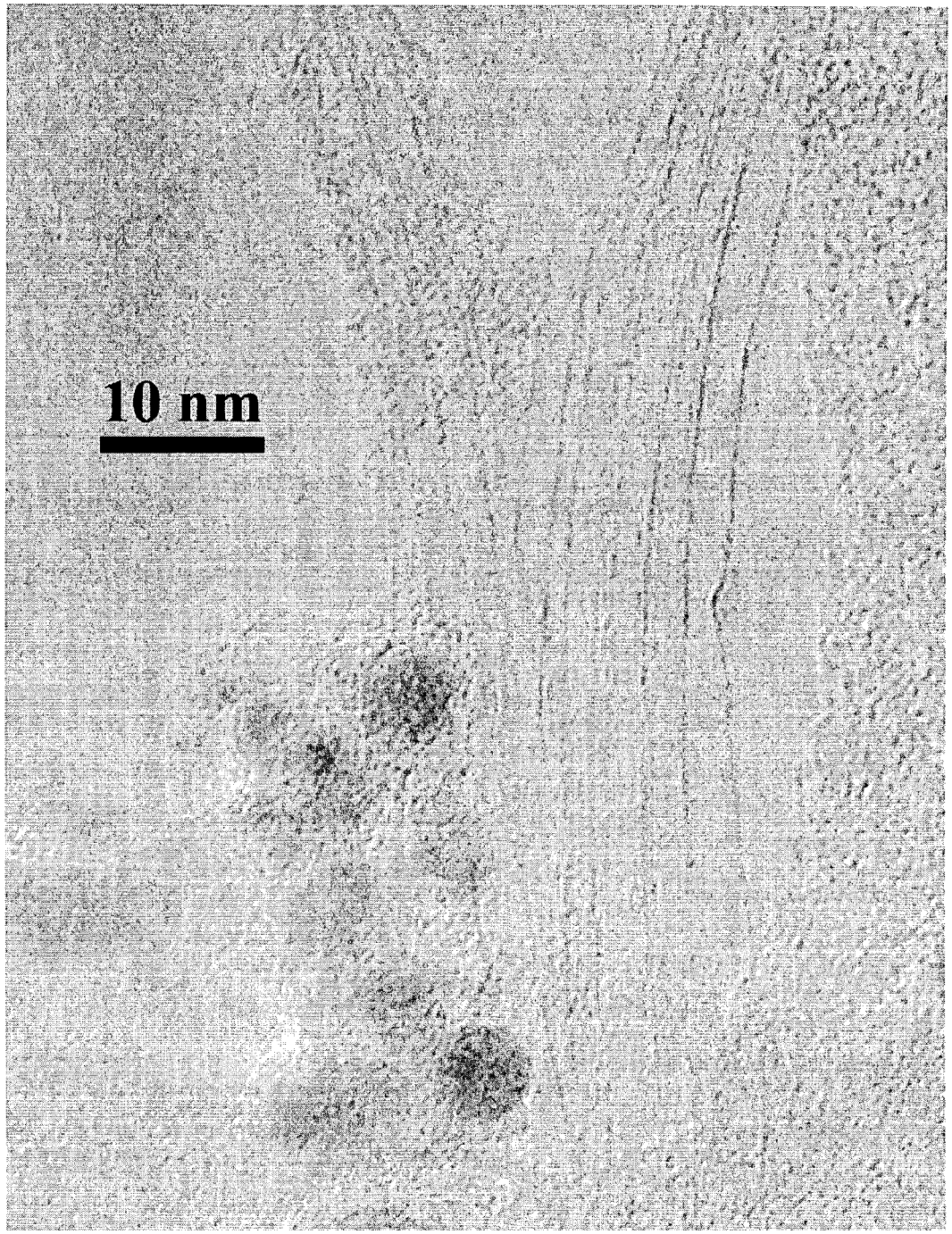
FIG. 15 is a transmission electron microscope micrograph of the product of the "floating catalyst" CCVD synthesis performed with the set-up presented on FIG. 14 under conditions described in the EXAMPLE 10 of the present invention. A thick bundle of tubes is shown.

An experimental set up as described in EXAMPLE 9 was used, except that no substrate plate was placed inside the mullite tube, and the product of the pyrolysis was deposited directly on its walls, as shown on FIG. 14. The floating catalyst precursor was a solution of 2.0 g of ferrocene, 1.0 g of cobaltocene, 4.0 g of nickelocene and 0.5 ml of thiophene in 100 ml of benzene. This solution was delivered into reactor at a feed rate 2 ml/h. Before admitting this solution and methane into reactor, its temperature was build up to the value 1300 C in the flow of 700 sccm of argon and 600 sccm of hydrogen. At this moment the synthesis was started by simultaneously adjusting the delivery of the benzene solution and the flow of 100 sccm of methane. The process was run for 30 min, then the solution, methane and hydrogen were shut off, and the reactor allowed to cool down in a slow flow of argon. The weight of the fibrous product collected from the reactor walls was about 250 mg, and by TEM examination it consists by more than a half of DWNTs and SWNTs in about equal amounts (FIG. 15). The result obtained renders the floating catalyst technique in the system employed a good candidate for mass production of DWNTs, as it bears the opportunity for easy scaling-up. Further, the processing parameters are multiple and easily controllable, therefore their optimization for high yield and selectivity for DWNTs seems quite feasible.

Example 11

Figure 16:
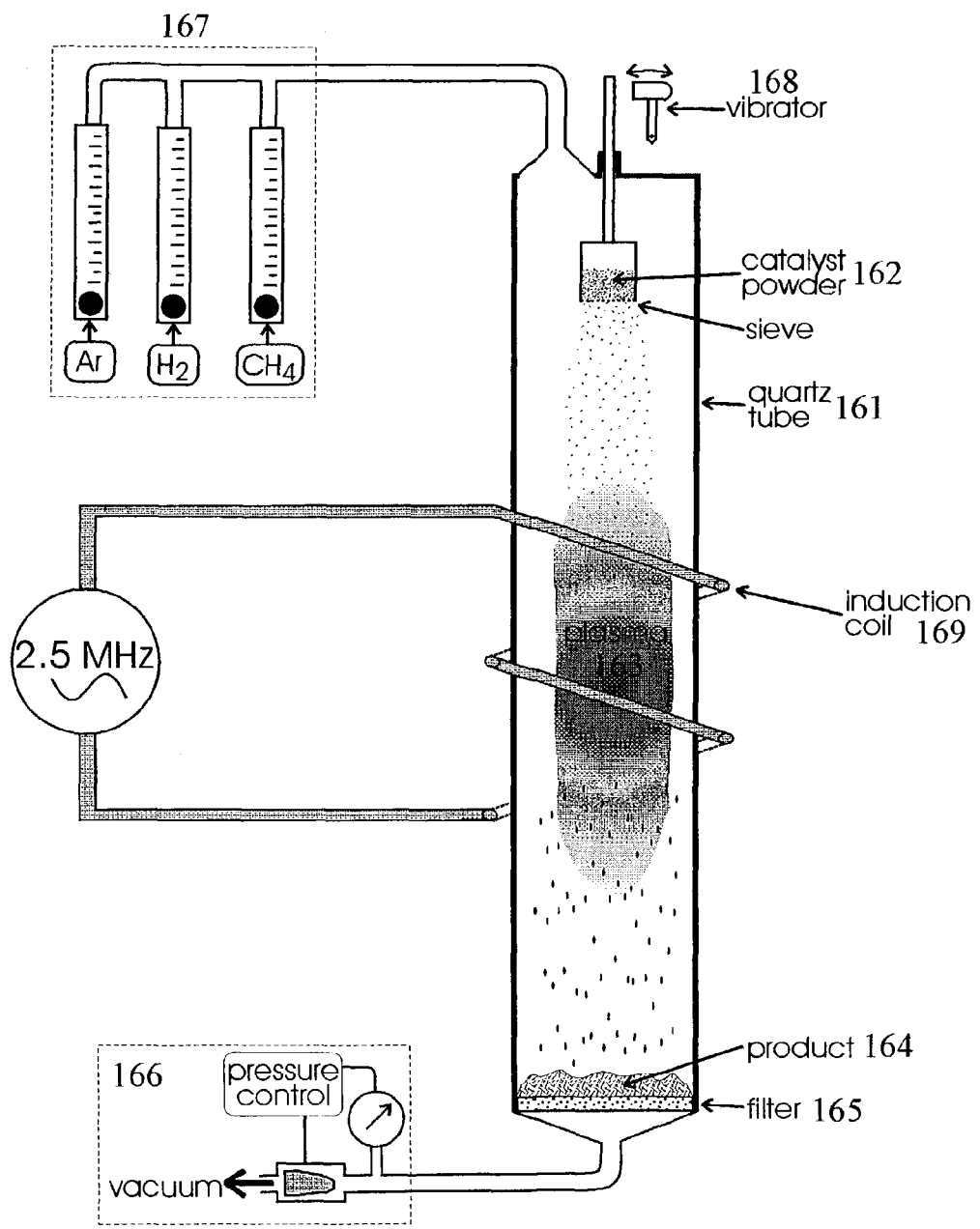
FIG. 16 is a schematic representation of a hot plasma reactor wherein the heating source comprises an induction coupled plasma type system and wherein hydrocarbon is used as a source of carbon to produce DWNTs and catalyst particulate is fed into reaction zone
Figure 17:
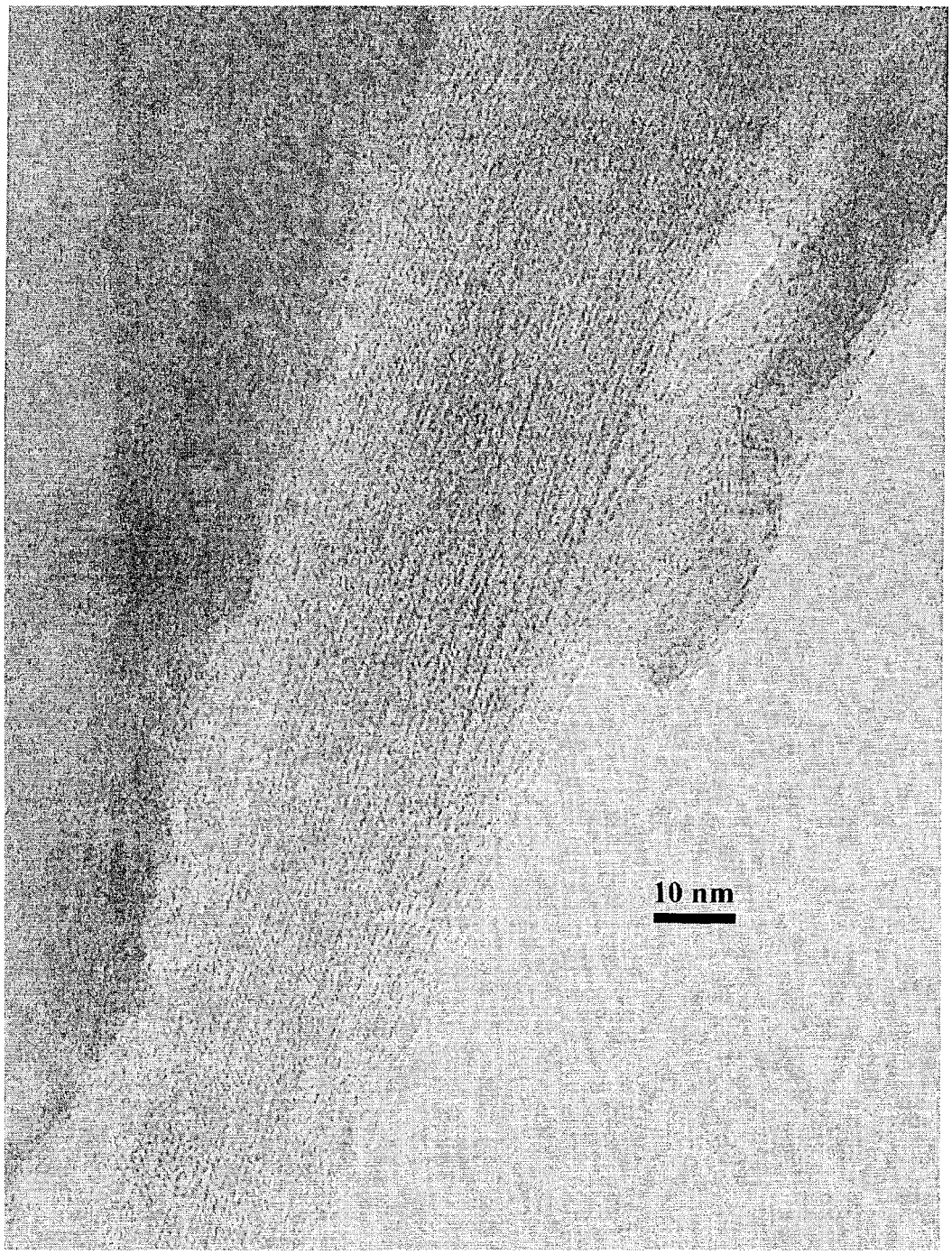
FIG. 17 is a transmission electron microscope micrograph of the product of the "floating catalyst" CCVD synthesis performed with the set-up presented on FIG. 16 under conditions described in the EXAMPLE 11 of the present invention. A separate DWNT is discernible on the image.

This example presents the performance of high frequency plasma-assisted catalytic methane pyrolysis in production of DWNTs FIG. 16 shows a flow reactor 161, made of a quartz tube 20 mm in diameter and 1.5 m in length, in which the catalyst powder 162, prepared according to EXAMPLE 1, is introduced into the downstream of methane-hydrogen-argon mixture and thus enters the hot inductively coupled plasma 163, wherein catalytic decomposition of methane occurs to produce a carbon product 164, collected on a glass cloth filter 165. The pressure controlling system 166 maintains a 300 Torr total pressure, while the rates 800, 1200 and 2000 sccm were maintained during the run by the gas flow system 167 for methane, hydrogen and argon, correspondingly. The run was started by turning on the vibrator 168, causing the delivery of the catalyst powder 162 at a pre-adjusted rate ~40 mg/min, and by simultaneously setting the values of output voltage and current to 8.0 kV and 1.8 A, developed in the induction coil 169 by the 2.5 MHz generator LEPEL T-30. The run time was 200 s. the weight of a fibrous product collected on the filter was about 450 mg. To purify the carbon component of the catalyst, the product was treated with 6 N HCl for 1 h. The TEM examination has shown the abundant presence of nanotubes in the purified product, including DWNTs prevailing over thick SWNTs, both in the form of rare separate tubes and unusually thick bundles, one of which is presented on FIG. 17.

Since its rate for tube production is about an order of magnitude higher than that of the arc discharge and thermal CVD processes, and can be further substantially increased, the hot plasma-assisted catalytic pyrolysis of hydrocarbons in the system developed has good chances for implementation in the mass production of DWNTs, despite its relative complexity. Moreover, a continuous plasma-assisted process can be obviously designed.

Example 12

This example presents the performance of high-frequency plasma-assisted pyrolysis of methane over the floating catalyst, in the production of DWNTs.

Figure 18:
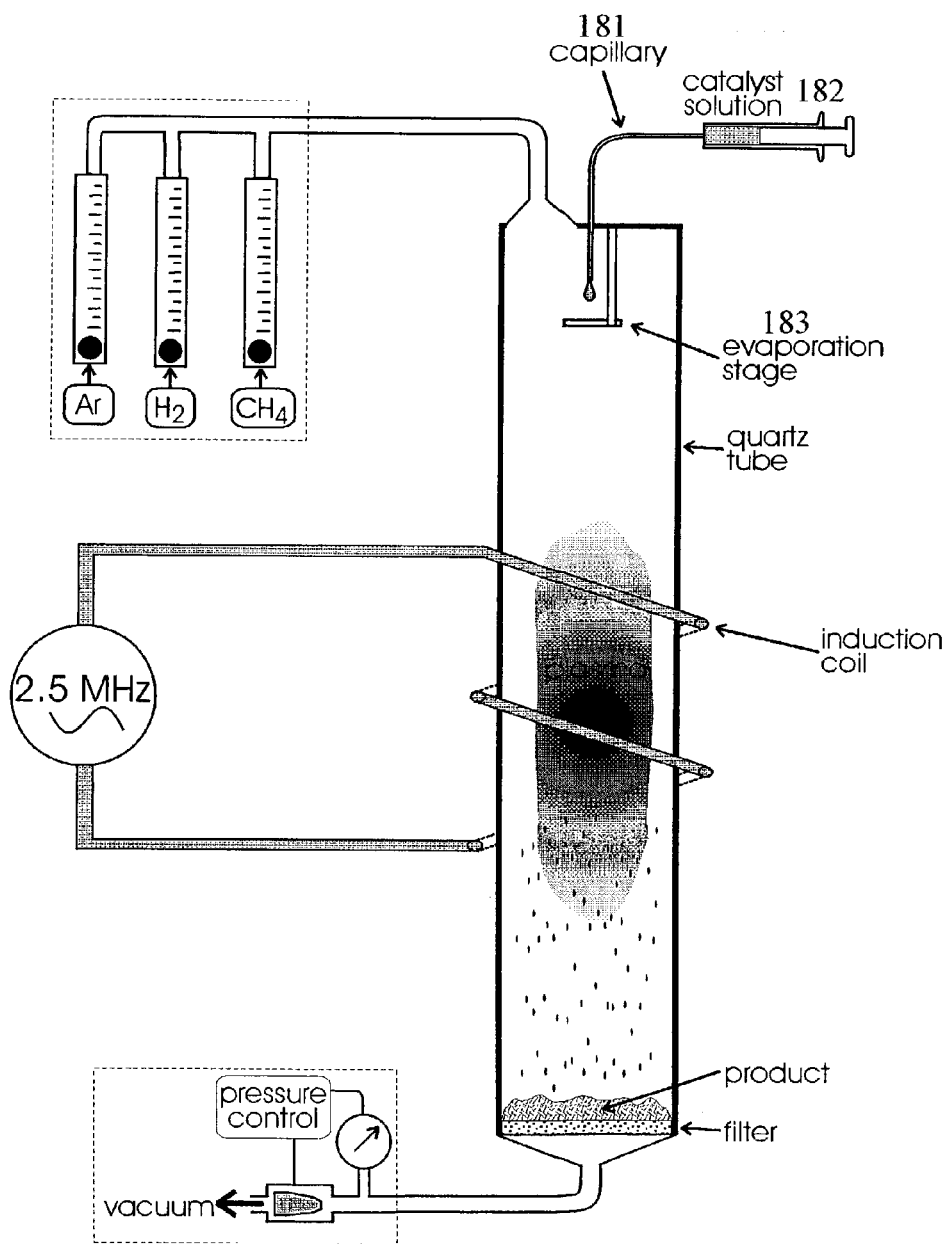
FIG. 18 is a schematic representation of apparatus similar to that shown in FIG. 16, but wherein the powder supply system is replaced by a syringe system delivering the benzene solution of the catalyst precursor into reaction chamber.

The experimental setup and running conditions were identical to those of EXAMPLE 11, excepting that the catalyst preparation and delivery were similar to those of EXAMPLE 10, and were performed as follows. The floating catalyst precursor solution was taken as prepared for Example 10. The upper lid of the plasma reactor (FIG. 18) was equipped with a go-through capillary 181 used to deliver the solution of iron, cobalt, nickel and sulfur compounds into reactor, by means of a syringe pump 182. The nozzle of the capillary is kept at low temperature, and the drops drawn from it fell down on an evaporation stage 183, which is maintained at a high enough temperature during a run to vaporize drops. The rate of the solution delivery though the capillary was set to 0.5 ml/min.

The product obtained was fibrous and much reminding in quality that produced with the use of the catalyst powder in the EXAMPLE 11 run. So, the active catalyst particles were obviously very similar in both cases. The relative easy of handling with the catalyst delivery makes the syringe pump technique somewhat preferable. That the synthesis of DWNTs is effective in different experimentation schemes, emphasizes the importance of retaining the found composition of the catalyst for DWNT production, and implies that it is probably close to optimal.

Example 13

A cold field electron emission DWNT cathode embodied in a CRT lighting element according to the present invention, as illustrated in FIG. 19, was constructed as follows. A sample of the DWNT materials as produced according to Example 1 was directly glued onto a stainless steel plate (FIG. 19, cathode 200 and carbon nanotubes 110 of a CRT) by using a conductive silver paste and baked at 450° C. in air to cure the silver paste. This cathode was covered with a control grid electrode (FIG. 19, grid 202). The cathode and the control grid were separated by a fixed distance using ceramic spacer (FIG. 19, spacer 201). The distance between the nanotubes tips and the grid, $d_{T-G}$, was 0.2 mm. A phosphor screen (FIG. 19, Phosphorescent 204), being an anode, was printed on the inner surface of a front glass plate and backed with an aluminum film (FIG. 19, anode 203), with 100-150 nm in thickness, to give electrical conductivity. The described CRT structure was enclosed within a vacuum tube, (not illustrated in FIG. 19) is having a transparent glass wall to permit light to be emitted from the phosphor screen. After sealing the vacuum tube, getter material was flashed to attain a high vacuum in the order of $5 \times 10^{-08}$ Torr with the vacuum tube.

The CRT structure comprised of the DWNT cathode, the anode and the control gauge were connected in a suitable electric circuit, in conventional manner well know in the art.

The nanotubes cathode of the CRT was grounded (0 V), and the control grid is biased to a positive voltage (in the range of 0.2-2.0 kV) to extract electrons from nanotubes tips of the cathode. FIG. 20 shows the current emitted from the nanotubes (DWNT) cathodes as a function of the voltage applied. The average field strength at $10 \,\mu A/cm^2$ was 1.43 V/μm. FIG.

21 shows the life test behavior of this DWNT material when used as a field emission device, i.e., as the cathode of a CRT.

Example 14

The same test was performed as in EXAMPLE 13 except MWNT produced from arc process was substituted as the cathode material. FIG. 19 shows the current emitted from the nanotubes (MWNT) cathodes as a function of the voltage applied. The average field strength at 10 $\mu A/cm^2$ was 4.32 V/$\mu$m.

Example 15

The DWNT material produced according to EXAMPLE 1 were crushed and mixed with pastes, slurried and screen printed on stainless steel plate and dried in air at 500° C. to produce a CRT cathode. This cathode material was tested according to EXAMPLE 13. The average field strength at 10 $\mu A/cm^2$ was 1.54 V/$\mu$m with very uniform electron emission.

What is claimed is:

1. A method of producing fullerenes comprising double walled nanotubes (DWNTs) via catalytic chemical vapor deposition which comprises
   (a) providing a source of carbon and a catalyst comprised of transition metal of the iron group of the periodic table of the elements and sulfur in the presence of a hydrogen containing gas and an inert gas in a reaction zone having a DWNT forming atmosphere; (b) heating said source of carbon and catalyst in the presence of said hydrogen containing gas and inert gas in the DWNT forming atmosphere in the reaction zone under conditions effective to produce hot carbon counting vapor and to obtain DWNTs, when said vapor is quenched; (c) quenching the hot vapor in said DWNT forming atmosphere, thus condensing the hot vapor to form a product comprised of DWNTs; and (d) collecting the resulting product and recovering said DWNTs from the resulting product outside the heated region of the reaction zone, wherein the catalyst mixture is comprised of 27% iron, 14% cobalt, 51% nickel and 8% sulfur, by weight.

2. A method of producing fullerenes comprising double walled nanotubes (DWNTs) via catalytic chemical vapor deposition which comprises:
   (a) providing a source of carbon and a catalyst comprised of transition metal of the iron group of the periodic table of the elements and sulfur in the presence of a hydrogen containing gas and an inert gas in a reaction zone having a DWNT forming atmosphere; (b) heating said source of carbon and catalyst in the presence of said hydrogen containing gas and inert gas in the DWNT forming atmosphere in the reaction zone under conditions effective to produce hot carbon counting vapor and to obtain DWNTs, when said vapor is quenched; (c) quenching the hot vapor in said DWNT forming atmosphere, thus condensing the hot vapor to form a product comprised of DWNTs; and (d) collecting the resulting product and recovering said DWNTs from the resulting product outside the heated region of the reaction zone, wherein the DWNT forming atmosphere contains a mixture of elemental hydrogen and argon gases, and at least one of the gases selected from the thiophene vapor, hydrogen sulfide, carbon disulfide and methane is added thereto, and wherein the gas mixture is pyrolyzed over a supported or floating metal catalyst and wherein catalytic pyrolysis is accomplished by utilizing inductively coupled high frequency plasma in a flow-through tubular reactor at reduced pressure, instead of thermal heating of gas flow.

3. The method of claim 2, wherein the catalyst is comprised of a mixture of particles of iron, cobalt, nickel and sulfur that is subjected to the preliminary step of heating under temperature and condition suitable to cause a reaction between the sulfur and the other metals of the mixture, thereby producing sulfides of said metals and wherein the powder comprising said catalyst is dispersed in the influent gas and thus delivered as a floating catalyst into a plasma region of vertically installed tubular reactor.

* * * * *